(12) United States Patent
Malman

(10) Patent No.: US 11,779,498 B2
(45) Date of Patent: Oct. 10, 2023

(54) MOBILITY AID SYSTEM

(71) Applicant: Eyal Malman, Gan Yoshiya (IL)

(72) Inventor: Eyal Malman, Gan Yoshiya (IL)

( * ) Notice: Subject to any disclaimer, the term of this patent is extended or adjusted under 35 U.S.C. 154(b) by 102 days.

(21) Appl. No.: 17/593,210

(22) PCT Filed: Mar. 4, 2020

(86) PCT No.: PCT/IL2020/050251
§ 371 (c)(1),
(2) Date: Sep. 13, 2021

(87) PCT Pub. No.: WO2020/183450
PCT Pub. Date: Sep. 17, 2020

(65) Prior Publication Data
US 2022/0142831 A1 May 12, 2022

(30) Foreign Application Priority Data
Mar. 13, 2019 (IL) .......................... 265328

(51) Int. Cl.
*A61G 3/02* (2006.01)
*B60J 5/04* (2006.01)

(52) U.S. Cl.
CPC .......... *A61G 3/0209* (2013.01); *B60J 5/0472* (2013.01); *B60J 5/0493* (2013.01); *A61G 2220/14* (2013.01)

(58) Field of Classification Search
CPC . A61G 3/0209; A61G 2220/14; B60J 5/0472; B60J 5/0493
USPC ..................................................... 296/37.13
See application file for complete search history.

(56) References Cited

U.S. PATENT DOCUMENTS

| | | | | |
|---|---|---|---|---|
| 4,299,527 A | * | 11/1981 | Pobocik | A61G 3/0209 |
| | | | | 414/921 |
| 4,365,924 A | * | 12/1982 | Brigman | A61G 3/06 |
| | | | | 414/921 |
| 4,479,752 A | | 10/1984 | Todd | |
| 4,483,653 A | * | 11/1984 | Waite | A61G 3/062 |
| | | | | 280/647 |
| 4,541,511 A | | 9/1985 | Muller | |
| 4,566,842 A | | 1/1986 | Clarke | |
| 5,466,111 A | * | 11/1995 | Meyer | B60N 2/245 |
| | | | | 414/800 |
| 5,540,539 A | * | 7/1996 | Wolfman | A61G 3/062 |
| | | | | 414/921 |
| 7,097,407 B2 | | 8/2006 | Kurohori et al. | |
| 7,404,505 B2 | | 7/2008 | Walther | |
| 9,463,121 B1 | * | 10/2016 | Maeshiro | B60N 2/06 |
| 10,363,178 B2 | * | 7/2019 | Garoosi | A61G 3/0808 |

(Continued)

FOREIGN PATENT DOCUMENTS

| | | | | |
|---|---|---|---|---|
| GB | 2 210 856 A | | 6/1989 | |
| GB | 2210856 A | * | 6/1989 | ........... A61G 3/0209 |

*Primary Examiner* — Hilary L Gutman
(74) *Attorney, Agent, or Firm* — Vorys, Sater Seymour and Pease LLP; Anthony P. Venturino; Maryellen Feehery Hank

(57) ABSTRACT

The invention relates to an accommodating door configured to be connected to a vehicle body, and a support cradle. The accommodating door has an inside face which defines an accommodation space configured for accommodating the support cradle. The support cradle in turn is configured to support a mobility aid device within a support compartment thereof.

21 Claims, 20 Drawing Sheets

(56) References Cited

U.S. PATENT DOCUMENTS

2005/0264020 A1* 12/2005 Egan .................. B60N 2/14
                                            296/65.01
2017/0135878 A1*  5/2017 Kitchin ............. A61G 3/062
2018/0326887 A1  11/2018 Newman

* cited by examiner

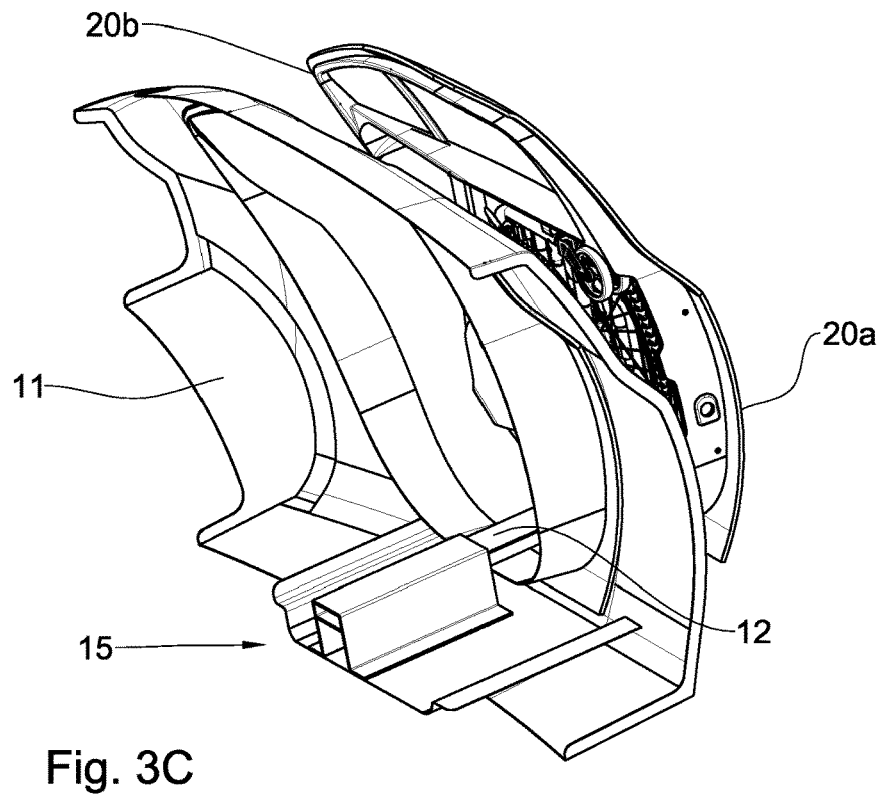
Fig. 3C
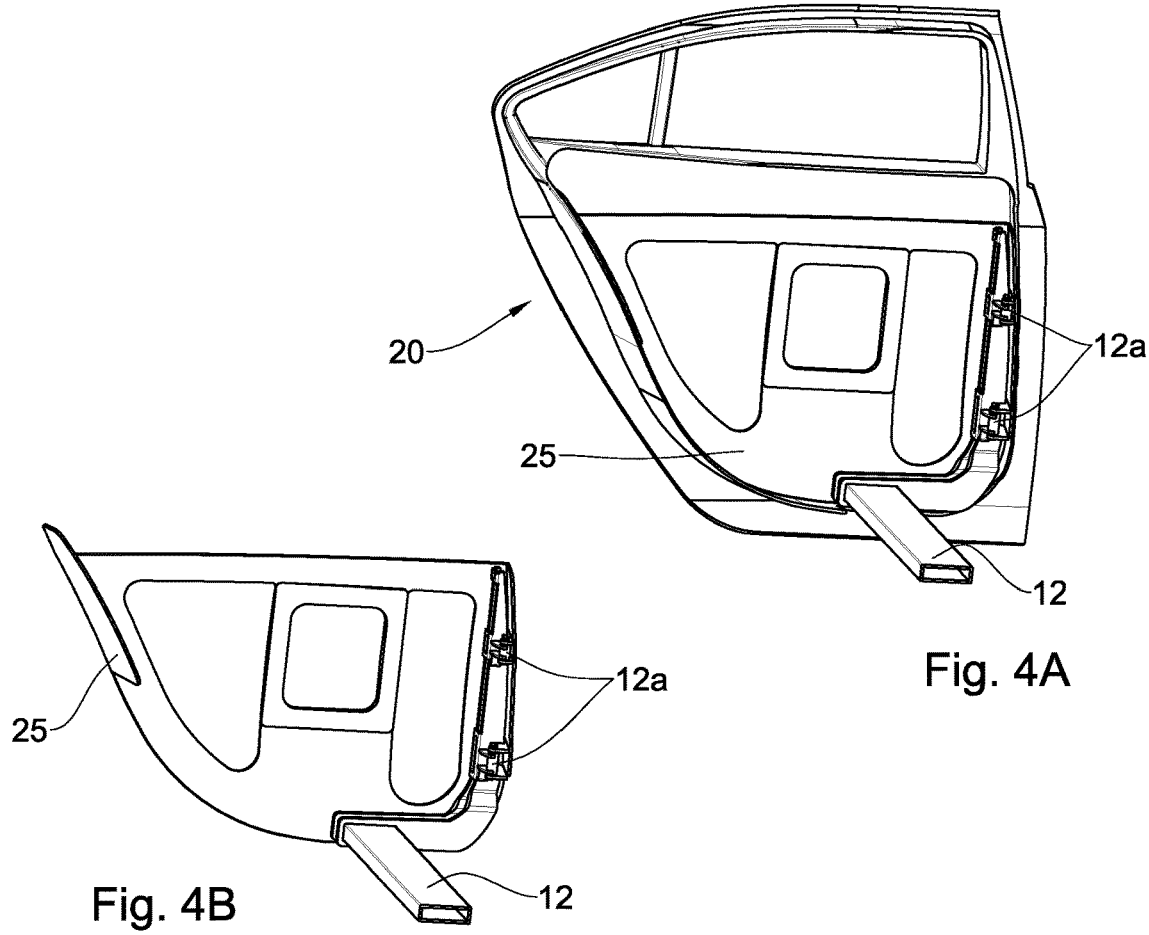
Fig. 4A
Fig. 4B

Fig. 10C
Fig. 11A
Fig. 11B
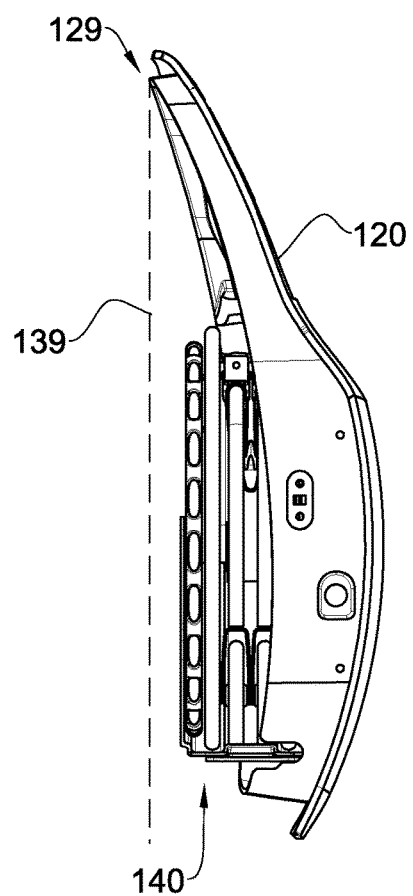
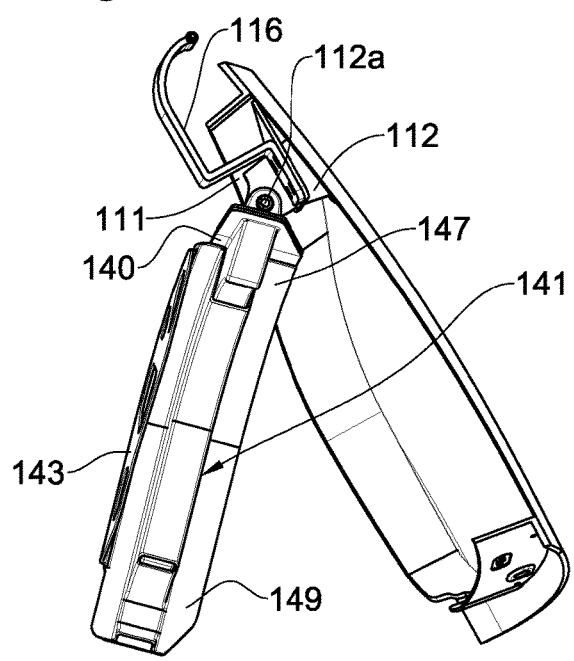
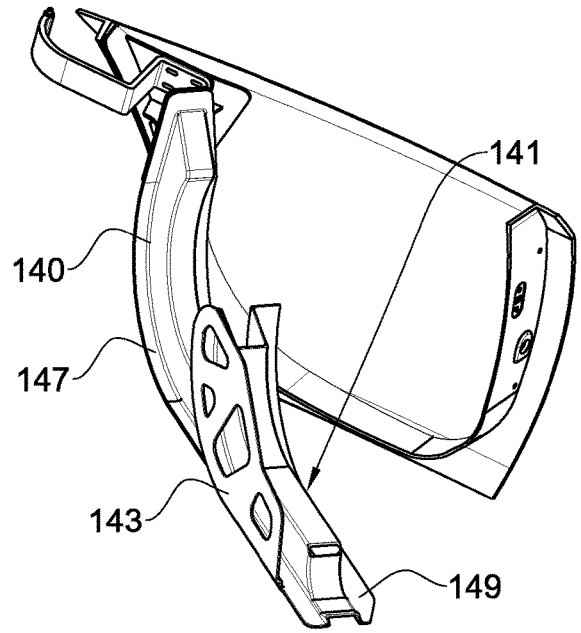

MOBILITY AID SYSTEM

TECHNOLOGICAL FIELD

The present disclosure is concerned with a vehicle storing and dispensing system for a mobility aid device.

BACKGROUND ART

A reference considered to be relevant as background to the presently disclosed subject matter is listed below:
U.S. Pat. No. 7,404,505
Acknowledgement of the above reference herein is not to be inferred as meaning that it is in any way relevant to the patentability of the presently disclosed subject matter.

BACKGROUND

Vehicles for the mobility impaired often include an arrangement for a mobility aid device. Such arrangements are normally compact, so as to minimize the space the mobility aid device occupies within the vehicle. Some arrangements are configured to store the mobility aid device inside the vehicle, other arrangements are configured to store the mobility aid device inside a trunk of the vehicle, and some are configured to store the mobility aid device in an external booth to the vehicle disposed typically on the vehicle roof.

Several arrangements include also a manual or an automatic dispensing mechanisms, configured to dispense the mobility aid device in proximity to the driver's door, so as to allow a mobility impaired person to drive the vehicle by himself.

U.S. Pat. No. 7,404,505 discloses an enclosed carrier for a folded wheelchair, mounted on the outside side of an automobile, behind and adjacent to the driver's door, so that a wheelchair user can shift himself from his wheelchair to the driver's seat, then fold and store his own wheelchair, thus maintaining an economical independence.

SUMMARY

The presently disclosed subject matter concerns with vehicles for people with mobility impairments and particularly to equipping vehicles with a compact arrangement for their mobility aid device, preferably within a door of the vehicle.

It can be appreciated that the vehicle door can be of any known type including a suicide door type (hinged at its rear rather than the front), a scissor door type, a butterfly door type, a gull-wing door type, a sliding door type, a canopy door type, a disappearing door type, or any other door type suitable for use as a side door of a vehicle for entering and exiting the vehicle, or as a trunk door of a vehicle for accessing a trunk thereof.

It can also be appreciated that the mobility aid device can be a manual self-propelled wheelchair, a powered wheelchair, an attendant propelled wheelchair, a mobility scooter, a seated walking scooter, a walker, a gait trainer, a stairlift, or any similar mobility aid device designed to assist walking or otherwise improve the mobility of people with a mobility impairment.

According to a first aspect of the presently disclosed subject matter there is provided an accommodating door configured to be connected directly or indirectly to a vehicle body, and a support cradle; the accommodating door having an inside face defining an accommodation space configured for accommodating a support cradle, which in turn is configured to support a mobility aid device within a support compartment thereof and dispense it to a deployment location outside the support compartment.

According to a second aspect of the presently disclosed subject matter there is provided a mobility aid device support cradle, shaped and sized so as to fit within an inside accommodation space of a accommodating door of a vehicle; the support cradle comprising a support compartment configured to support a mobility aid device at a collapsed state, and a dispensing mechanism configured to displace the collapsed mobility aid device between the support compartment and a deployment location outside the support compartment.

According to a third aspect of the presently disclosed subject matter, there is provided a dispensing mechanism configured for use with a support and dispensing system of a mobility aid device, the dispensing mechanism comprising a track, and a mobility aid device carrier cart at least slidingly displaceable along the track between a stowed position, and a dispensing position.

According to the third aspect of the presently disclosed subject matter, there is provided a dispensing mechanism configured for use with a support cradle of a mobility aid device, the support cradle being accommodatable within an inside accommodation space of an accommodating door of a vehicle together with the mobility aid device; the dispensing mechanism comprising a track, and a mobility aid device carrier cart configured to displace along the track between a stowed position, and a dispensing position, so as to facilitate displacing of the mobility aid device between a support compartment of the support cradle and a deployment location outside the support compartment.

According to a fourth aspect of the presently disclosed subject matter there is provided a vehicle having a vehicle body and comprising at least one accommodating door connected to the vehicle body and having an inside face facing an interior of the vehicle and defining an accommodation space accommodating therein a support cradle connected to at least one of the vehicle body and the accommodating door, the support and dispensing cradle being configured to support a mobility aid device within a support compartment thereof.

According to a fifth aspect of the presently disclosed subject matter there is provided a method for converting a vehicle into a mobility aid device carrying vehicle, the method comprising the steps of:

(a) connecting an accommodating door to the vehicle, the accommodating door having an inside face which defines an accommodation space, and configured to face the interior of the vehicle when the accommodating door is connected thereto; and (b) connecting a support and dispensing cradle to at least one of the vehicle body and the accommodating door, the support and dispensing cradle configured to support the mobility aid device within a support compartment thereof, and dispense the mobility aid device outside the support compartment.

Any one or more of the following features, design and configurations can be applied to an accommodating door, a mobility aid device support cradle, a dispensing mechanism, a vehicle, and a method according to the present disclosure, separately or in various combinations thereof:

The accommodating door can be displaceable between an open position and a closed position, wherein at the open position a dispensing gap extends between a front edge of the door and the vehicle body, which is wider than the support compartment of the support cradle, rendering it suitable for dispensing the mobility aid device therethrough.

According to a particular arrangement, at the closed position of the accommodating door, a contour of an edge portion of an outside face of the accommodating door coincides with an adjacent contour of an outside face of the vehicle body.

According to an even more particular arrangement, at the closed position of the accommodating door, the accommodating door is flush with the vehicle body.

The accommodating door can further comprise an inner concavity in its inside face, the inner concavity can define at least a portion of the accommodation space.

The accommodation space can be configured to accommodate at least a majority of the support cradle.

According to a particular configuration, the support cradle can be configured to be accommodated within the accommodation space in its entirety.

According to a particular configuration the entire mobility aid device can be accommodated within the accommodation space.

The accommodating door can further comprise a window and the accommodation space can be defined beneath the window, such that the support cradle and the mobility aid device accommodated therein does not project above a bottom window line.

The support compartment can be confined by an inner facing wall of the support cradle, defining a finger free space which prevents access to the support compartment for a passenger sitting within the vehicle.

The dispensing gap can extend alongside the accommodating door or alongside the vehicle body.

When the accommodating door is a rear passenger door, disposed behind a driver door of the vehicle, the dispensing gap can face towards a front of the vehicle, i.e., towards the driver door, such that the deployment location is reachable for a person occupying a driver seat of the vehicle.

The support cradle can be connected to the vehicle via a load bearing member articulated at one side thereof to the vehicle body; the load bearing member can be displaceable between a retracted position where the accommodating door is at its closed position, and an operational position where the accommodating door is at its open position.

The load bearing member can be articulated to the vehicle frame.

The load bearing member can be articulated to the vehicle via a linear displacement mechanism facilitating its displacement between the retracted position and the operational position.

The arrangement can be such that the load bearing member is configured to displace the accommodating door perpendicularly to the vehicle body.

The arrangement can further be such that at the open position, the accommodating door maintains its orientation with respect to the vehicle body, forming gaps from either side thereof.

The accommodating door can be hingedly articulated to the load bearing member.

The accommodating door can further comprise a reinforcement flange configured to reinforce the door under pressure and loads applied thereon.

According to a particular configuration, the accommodating door is configured to connect to the load bearing member via the reinforcement flange.

The support cradle can be connected to the accommodating door via an extension mechanism configured for displacing the support cradle between a storing position where the support cradle is at least partially accommodated in the concavity, and an extended position where at least the support compartment of the support cradle is disposed outside the concavity.

The extension mechanism can be a scissors mechanism attached to the inside face of the accommodating door. Particularly, the scissors mechanism can displace the support cradle in a parallel fashion to the inside face.

According to a particular configuration, the scissors mechanism is also configured to connect to the reinforcement flange of the door.

The accommodating door can be disposed in register with a seating compartment of the vehicle comprising a seat, the arrangement being such that a backrest of the seat is symmetrically disposed with respect to a central longitudinal axis of the vehicle.

The accommodating door can have two open positions, a first open position where the dispensing gap extends between the front edge of the door and the vehicle body, and a second open position where an entry gap extends between a back edge of the door and the vehicle body, wider than the dispensing gap and suitable for passenger entry therethrough to the vehicle. According to a particular example, the entry gap extends between the front edge of the door and the vehicle body.

Switching between the closed position and the first open position of the accommodating door can be automatic to allow a mobility impaired driver performance thereof, and switching between the closed position and the second open position of the accommodating door can be at least partially manual facilitating a passenger to open the accommodating door and enter the vehicle. It can be appreciated that in other embodiments of the presently disclosed subject matter, switching between the closed position and the second open position of the accommodating door can be fully automated.

According to a particular configuration, switching between the closed position and the second open position of the accommodating door can be performed in two stages: a first stage which includes displacement of the accommodation door by the load barrier member, to an operational distance from the vehicle body allowing the accommodating door to swing with respect to the load bearing member about the hinge connecting therebetween, and a second stage which includes swinging the accommodating door about the hinge to establish the entry gap.

The first stage can be performed automatically.

The term "automatically" as disclosed herein refers to an operation performed by a machine, the operation can be controllable or non-controllable by a user of the machine.

The dispensing mechanism can be disposed within the support compartment of the support and dispensing cradle rendering it a support and dispensing cradle.

According to a particular configuration, the accommodating door is formed within an OEM (original equipment from manufacturer) door, which for the purposes of this configuration constitutes as a part of the vehicle body. In such configuration the accommodating door can be configured to displace relatively to the OEM door such that in the open position the accommodating door is configured to protrude from the OEM door and at the closed position it is configured to be flush therewith. Thus, according to this configuration, there is provided a door-in-door arrangement, wherein the accommodating door is formed within the original vehicle door and displaces with respect thereto. Herein the specification and claims, the term door is used to define a uniform door or a door-in-door.

At the stowed position the carrier cart can have a stowed orientation, different than a dispensing orientation thereof at the dispensing position, with respect to the ground.

According to a particular configuration, the mobility aid device is a wheelchair, and wherein a wheel axis of the rear wheels of the wheelchair maintains its orientation at both the stowed position and the dispensing position. In particular the orientation of the wheel axis remains parallel to the ground.

The carrier cart has a leading end and a trailing end, and according to a particular configuration, at the stowed orientation the leading end is leveled or higher with respect to the trailing end, and at the dispensing orientation the leading end is lower than the trailing end.

According to a particular configuration, the stowed orientation of the carrier cart is a horizontal orientation, whilst the dispensing orientation is a vertical orientation.

The track can be formed with a downward curve, such that the carrier cart changes its orientation from the stowed orientation to the dispensing orientation after reaching the downward curve.

The track can be formed with a horizontal portion at one side of the downward curve, at which the stowed position of the carrier cart is defined, and a vertical portion at another side of the downward curve, at which the dispensing position of the carrier cart is defined.

The carrier cart can be hingedly connected to the track so as to be able to tilt with respect to the track at least at an area of the downward curve, thereby switching between its stowed orientation and its dispensing orientation.

The carrier cart can comprise an articulation member for holding the mobility aid device.

The carrier cart can be displaced by an internal displacement arrangement such as an internal electric engine configured to drive wheels of the carrier cart, or by an external displacement arrangement including a linear displacement arrangement configured to push and pull the carrier cart from its trailing end; an example thereof can be a lead screw connected to an electric motor, an hydraulic piston, a pneumatic piston, etc.

The linear displacement arrangement can be connected to the carrier cart at a location distal from the hinge along the carrier cart, so as to allow the carrier cart to go beyond the downward curve of the track. At this configuration, the electric motor can be connected to the support and dispensing cradle via a hinge, allowing it to change its orientation oppositely to the carrier cart.

The dispensing mechanism can further comprise a lowering and raising mechanism configured for lowering the mobility aid device between a dispensing height and a storing height higher than the dispensing height.

The carrier cart can also include a displacement mechanism, configured for linearly displacing a carrying portion of the carrying cart with respect to a track engaging portion thereof.

When the carrier cart is at its dispensing orientation, this displacement mechanism can constitute the lowering and raising mechanism.

The disposition of the carrier cart from its stowed position to its dispensing position can be performed in two stages: a first stage which include linear displacement of the carrier cart towards an end of the support and dispensing cradle, and a second stage which include tilting of the carrier cart so as to change its orientation from the stowed orientation to the dispensing orientation; In parallel, or preferably when the carrier cart is at its dispensing orientation, the displacement mechanism of the carrier cart can displace the mobility aid device with respect to the track engaging portion of the carrier cart, thereby causing the mobility aid device to be positioned at the dispensing height.

When the mobility aid device is a wheelchair, the arrangement of the carrier cart and the track can be such, that a driving plane of the wheelchair defined tangentially to its wheels, is perpendicular to the track.

All of the mechanism discussed hereinabove can be operated by an electric control system, and each of which can further comprise an emergency manual manipulation mechanism configured to facilitate an operation thereof when electricity is unavailable.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3C is a front perspective view of the accommodating door together with the portion of a vehicle body, and the load bearing member, where the accommodating door is at the open position;

FIG. 4A is a perspective view of the accommodating door and a load bearing member according to an example of the present disclosure, with several elements omitted for clarification;

FIG. 4B is a perspective view of a reinforcement flange of the accommodating door of FIG. 4A stripped from the accommodating door;

FIG. 10C is a side view of the accommodating door of FIG. 10A;

FIG. 11A is a perspective view of the accommodating door of FIG. 10A, where a support cradle is disposed at its extended position, and an upper portion of the accommodating door is removed;

FIG. 11B is a perspective view of the accommodating door of FIG. 11A, where the support cradle is at its dispensing position.

DETAILED DESCRIPTION OF EMBODIMENTS

Figure 1:
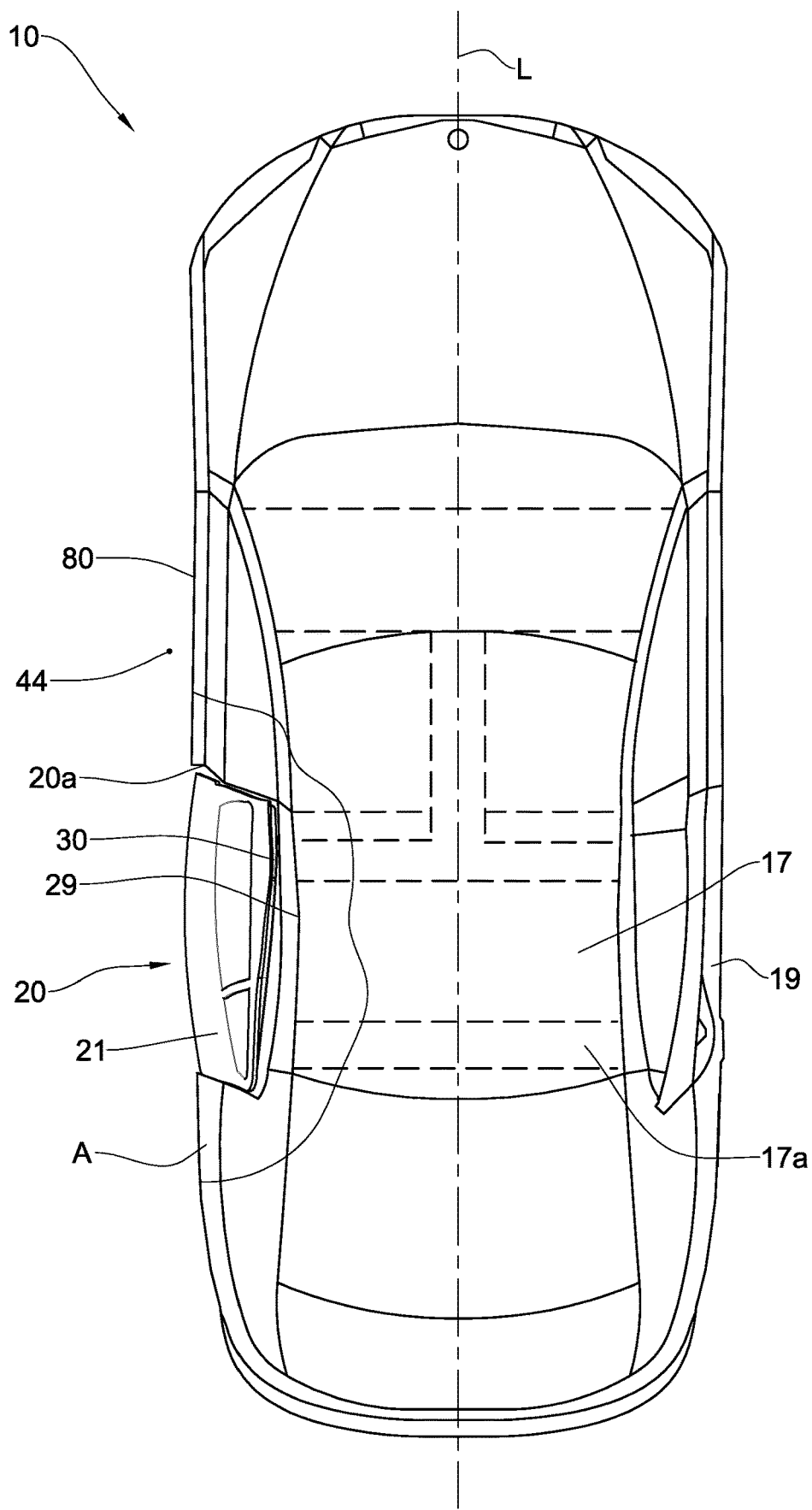
FIG. 1 is a top view of a vehicle according to an example of the present disclosure, where parts in an interior thereof are seen in dashed lines.

Attention is first directed to FIG. 1 illustrating a vehicle according to the present disclosure, generally designated 10, configured to transport a mobility impaired person [not illustrated] together with a mobility aid device constituted by a collapsed wheelchair 30. The vehicle 10 in the present example is a sedan vehicle with five doors, having a vehicle body 11. One of the doors, constituting a rear passenger door at a driver side of the vehicle 10, is an accommodating door 20 configured to accommodate therein the collapsed wheelchair 30, as seen in FIG. 1, and as will be explained hereinafter. In other embodiments of the presently disclosed subject matter, any other type of vehicle can be used, and be accompanied by more than one accommodating door.

Figure 2A:
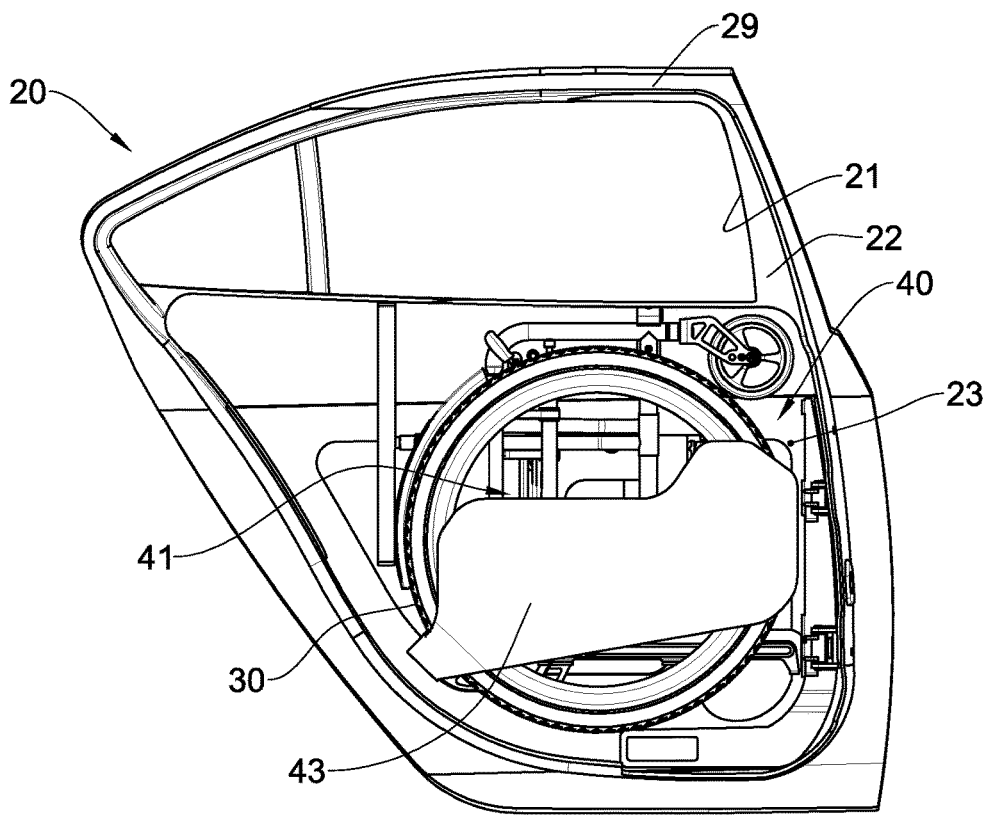
FIG. 2A is a side view of an accommodating door according to an example of the present disclosure.

The accommodating door 20, seen in greater detail in FIGS. 2 and 3, is a modified OEM (original equipment from manufacturer door), having an inside face 22 facing the interior of the vehicle 10 and defining an accommodation space 23, configured to accommodate a support and dispensing cradle 40, best seen in FIG. 6, configured to support the collapsed wheelchair 30 within a support compartment 41 thereof, and according to a particular example, to dispense the collapsed wheelchair 30 at a deployment location 44 (FIG. 1) positioned outside the support compartment 41 near a driver door of the vehicle, at a height and distance from the driver door rendering the collapsed wheelchair 30 reachable for the mobility impaired driver of the vehicle. The dispensing herein is performed by a dispensing mechanism 50, as will be explained hereinafter. It is appreciated that in the present example, the cradle 40 is configured as a combined support and dispensing cradle, though according to other configurations (e.g. as disclosed in FIG. 10) the cradle can be merely a support cradle.

Figure 3A:
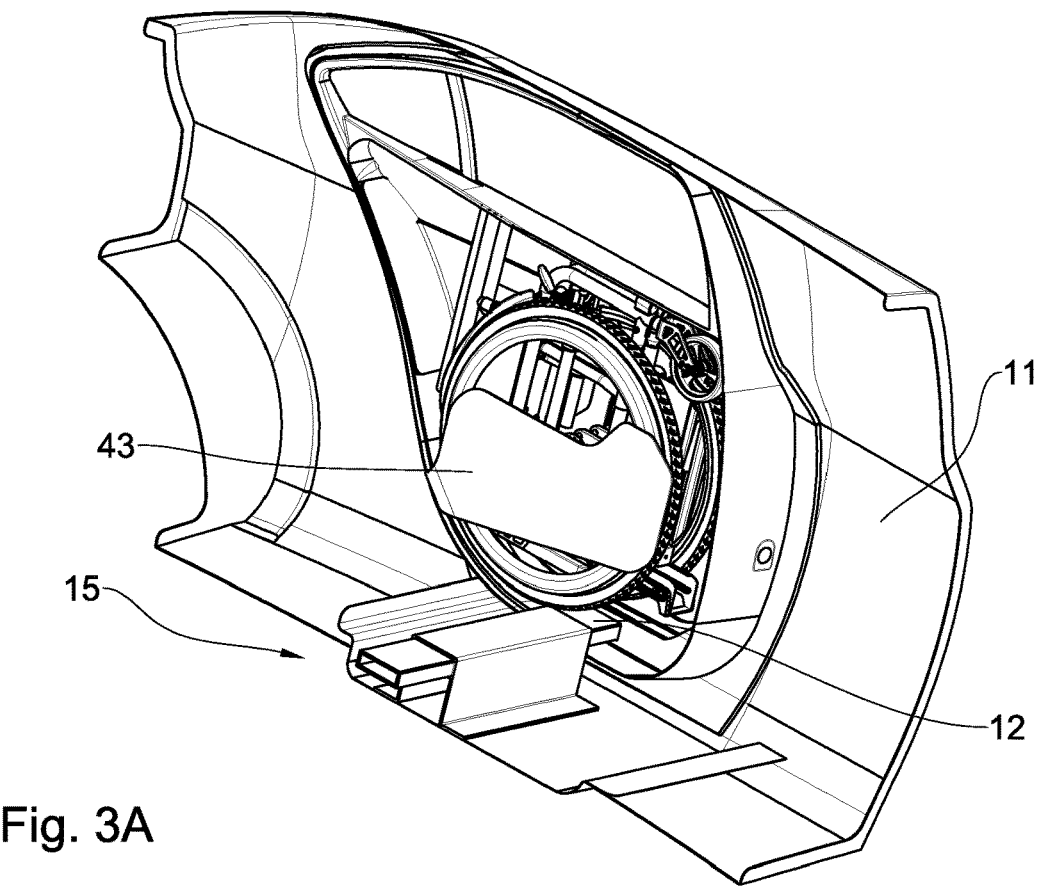
FIG. 3A is a front perspective view of the accommodating door together with a portion of a vehicle body, and a load bearing member, where the accommodating door is at the closed position.
Figure 3B:
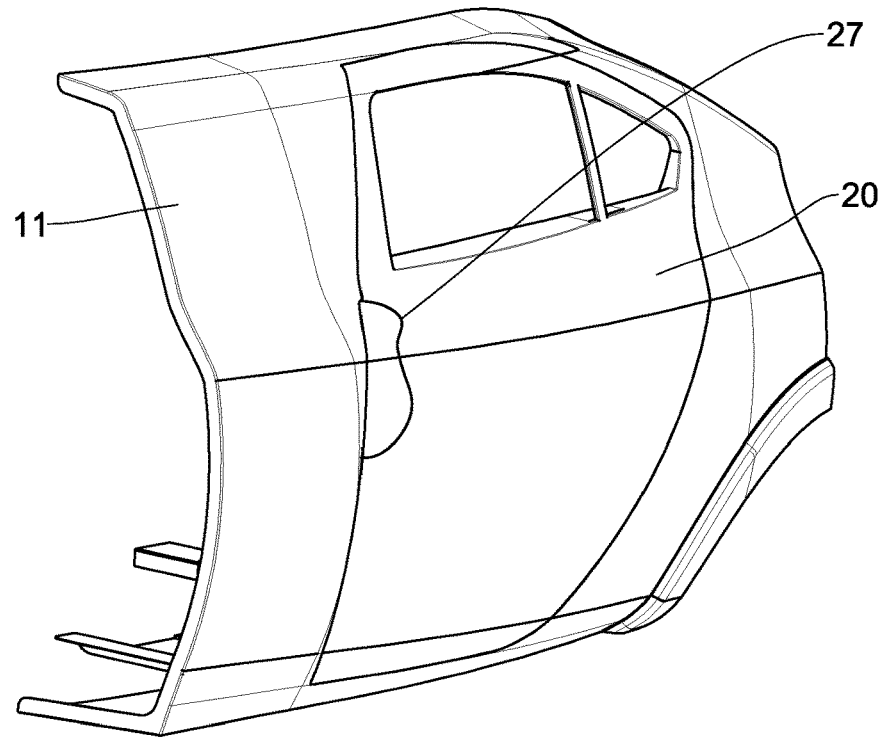
FIG. 3B is a rear perspective view of the accommodating door of FIG. 3A.

Attention is now directed towards FIGS. 3A to 3C.

The accommodating door 20 is connected to the vehicle body 11 via a load bearing member 12, configured to extend and retract away from and into the vehicle body 11 in a sliding fashion, so as to displace the accommodating door 20 between a closed position, shown in FIG. 3A, and an open position, shown in FIG. 3C, utilizing therefor a telescopic mechanism 15 which in the present example is helical displacement mechanism (not seen, any other suitable mechanism can be used) articulated to a frame portion of the vehicle body 11.

In this embodiment the arrangement is such, that when the accommodating door shifts between the open position and the closed position, its orientation with respect to the vehicle body 11 remains (i.e., displaces parallel thereto), creating a gap G between the accommodating door 20 and the vehicle body 11. Furthermore, at the closed position of the accommodating door 20 it is flush with the vehicle body 11, as seen in FIG. 3B, such that a contour of an edge portion of an outside face thereof, e.g. edge portion 27, coincides with an adjacent contour of an outside face of the vehicle body 11.

The accommodating door 20 further comprises a reinforcement flange 25 having a concave shape conforming with an inside shape of a portion of the accommodating door, best seen in FIG. 4B, configured to support and reinforce the accommodating door 20 under pressure and loads applied thereon, via which the accommodating door 20 is configured to connect to the load bearing member 12.

Figure 5A:
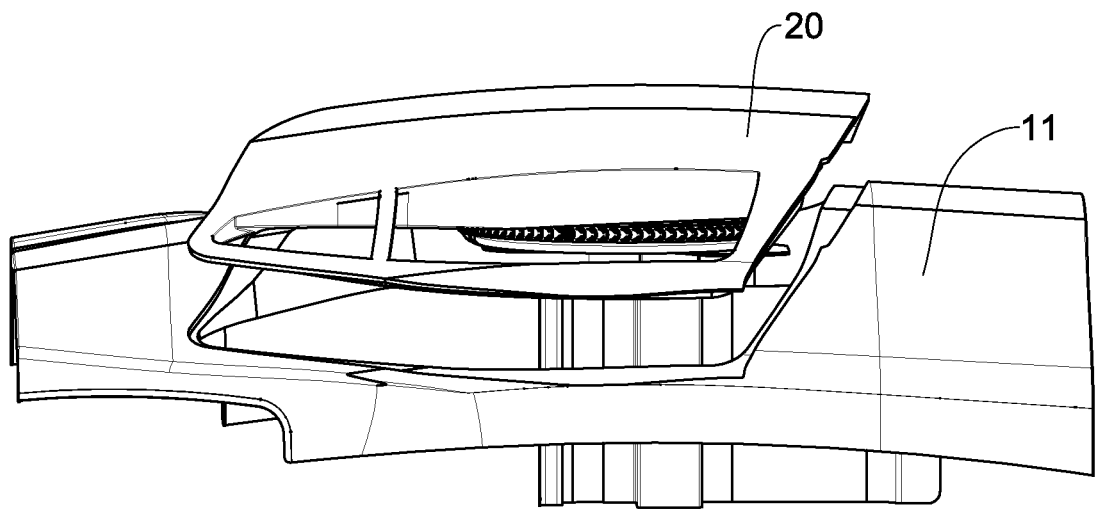
FIG. 5A is a top view of the portion A shown in FIG. 1A, where the accommodating door is at an intermediate position.
Figure 5B:
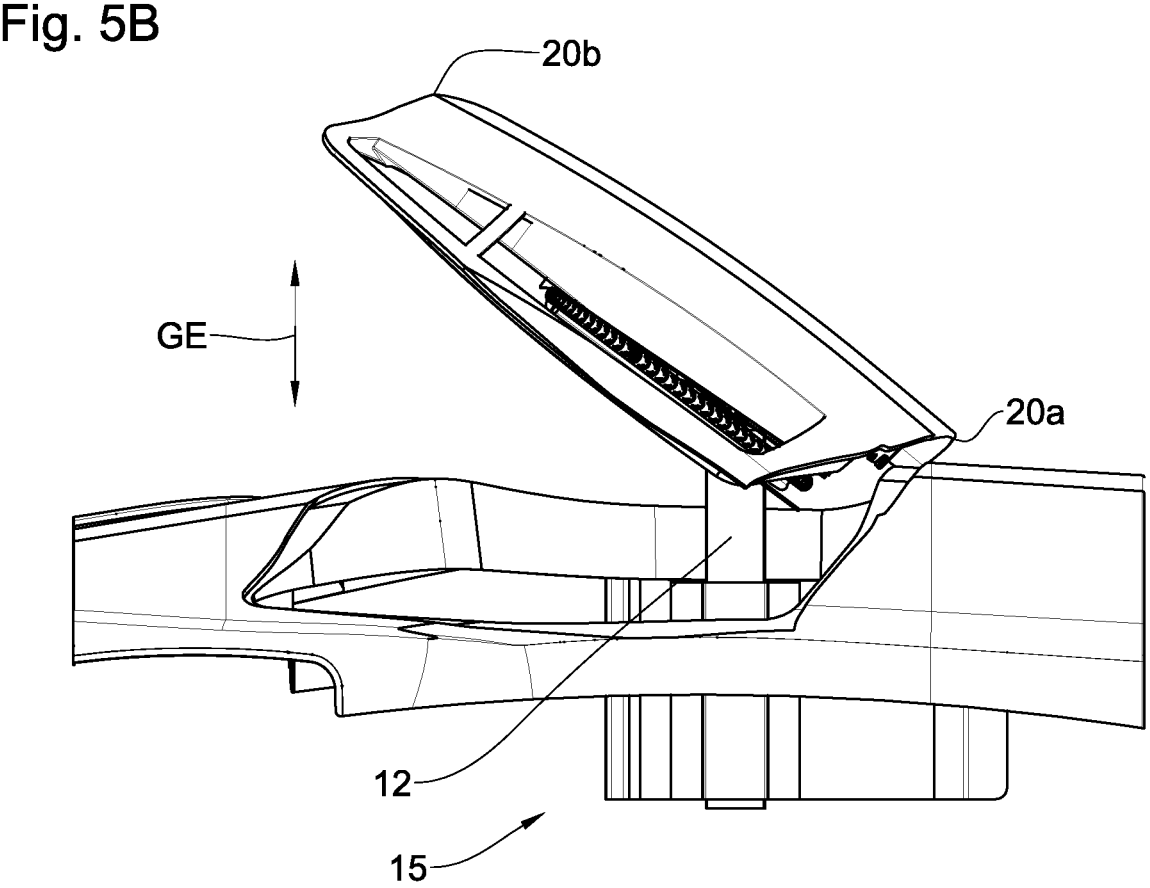
FIG. 5B is a top view of the portion A shown in FIG. 1A, where the accommodating door is at the second open position.

The reinforcement flange 25 is mounted to the load bearing member 12 via hinges 12a, about which it is configured to pivot together with the accommodating door 20 with respect to the load bearing member 12, to allow a second open position of the accommodating door 20, seen in FIG. 5B, where an entry gap GE to the vehicle 10 extends between the rear end 20b of the accommodating door and the vehicle body 11. Pivoting of the accommodating door can be performed manually to allow a passenger to enter/leave the vehicle via gap GE without assistance.

In the present embodiment the hinges 12a are distal from the front end 20a of the accommodating door 20, so that the pivoting thereabout of the accommodating door 20 to the second open position can only be achieved when the accommodating door is at least partially distant from the vehicle body 11, as seen in FIG. 5A. It can be appreciated that in other embodiments of the presently disclosed subject matter, the hinges 12a can be located differently to allow pivoting thereabout even when the accommodating door is at its closed position. Furthermore, a different hinge system can be used to allow such, for example an external hinge, a dual axis hinge having two parallel pivoting axes, etc.

According to the present embodiment, when displacing the accommodating door 20 into the second open position, the telescopic mechanism 15 firstly extends the load bearing member 12 together with the accommodating door 20 to an intermediate position, i.e. an operational position, seen in FIG. 5A (parallel motion), between the closed position shown in FIG. 3A and the open position shown in FIG. 3C. And a passenger entering/leaving the vehicle 10 should then manually pivot the accommodating door 20 about the hinges 12a until it reaches the second open position, seen in FIG. 5B.

Attention is now directed towards FIGS. 6A to 6E.

Figure 6A:
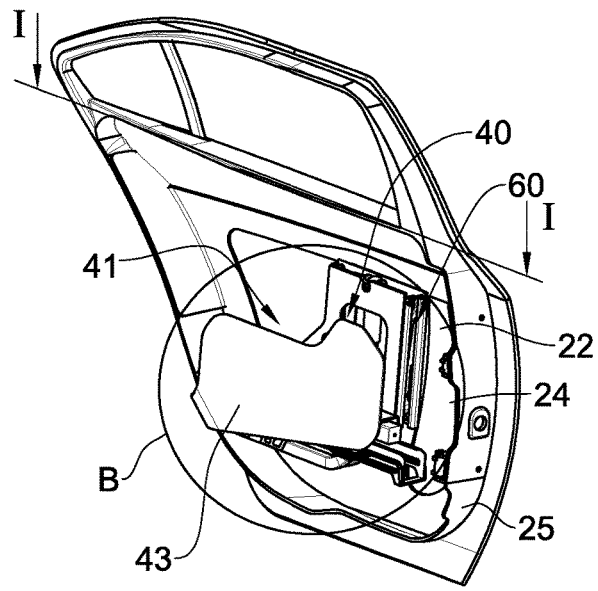
FIG. 6A is a perspective view of the accommodating door of FIG. 2A, without the mobility aid device, where the support cradle is at a storing position.
Figure 6B:
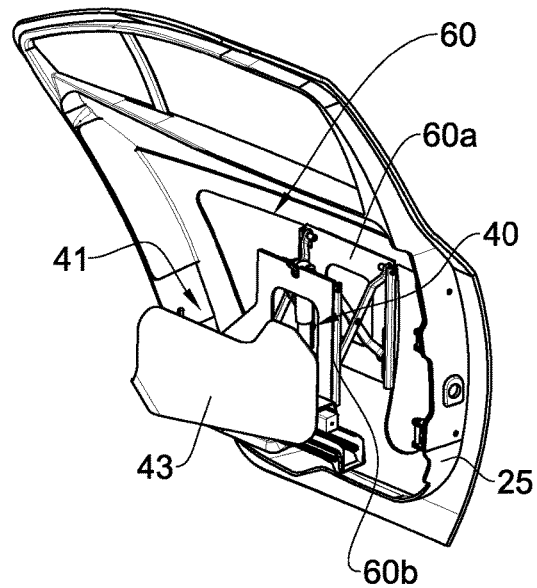
FIG. 6B is a perspective view of the accommodating door of FIG. 6A, where the support cradle is at an extended position.
Figure 6C:
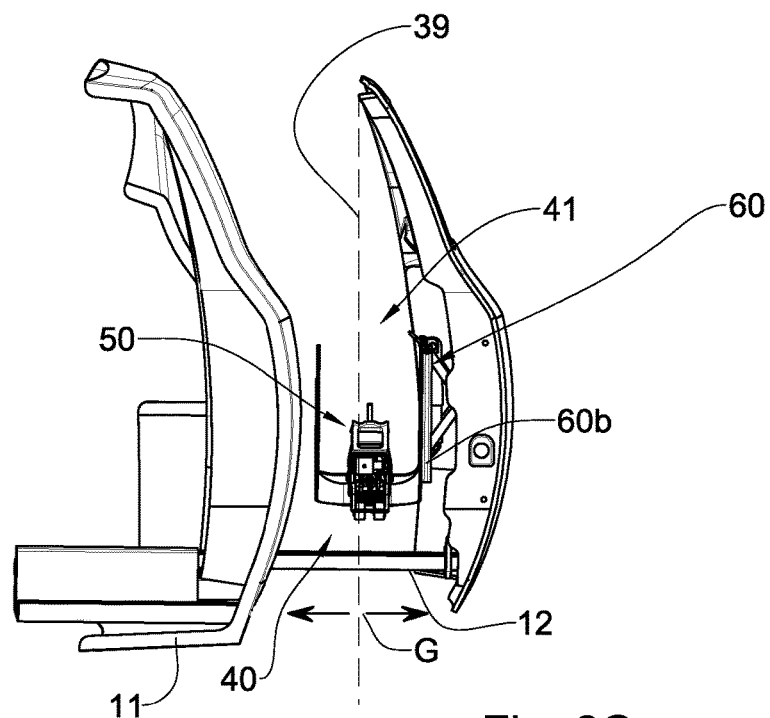
FIG. 6C is a side view of the portion A shown in FIG. 1A, where the accommodating door is at an open position and the support cradle is at the extended position.
Figure 6D:
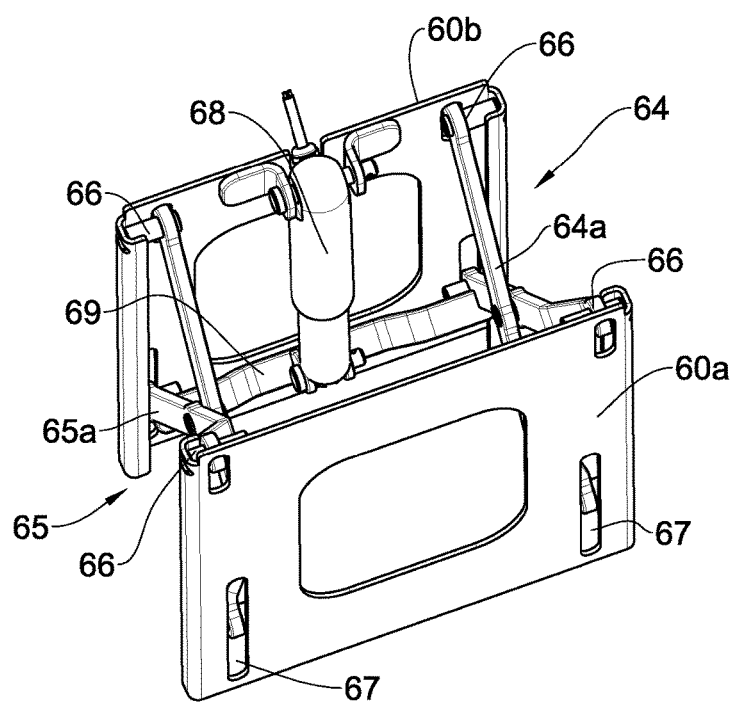
FIG. 6D is a perspective view of the extension mechanism at an extended state.
Figure 6E:
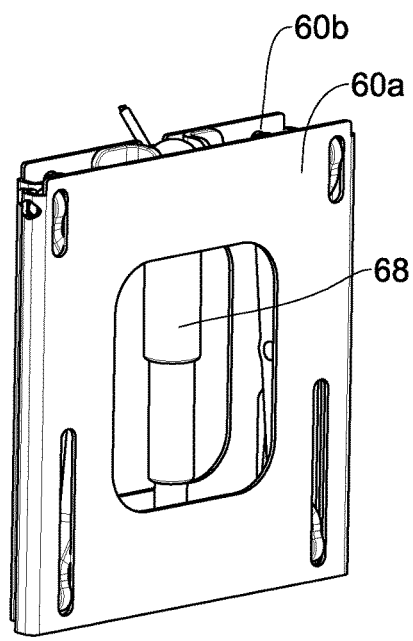
FIG. 6E is a perspective view of the extension mechanism at a retracted state.

The support and dispensing cradle 40 is connected to the inside face 22 of the accommodating door 20, at an area of a concavity of the accommodating door 20, via an extension mechanism in the form of scissors mechanism 60, seen in greater detail in FIGS. 6D and 6E, configured for displacing the support and dispensing cradle 40 between a storing position, seen in FIG. 6A, where the support and dispensing cradle 40 is disposed adjacent to the inside face 22 of the accommodating door 20, partially within the concavity, and an extended position, best seen in FIGS. 6B and 6C, where the support and dispensing cradle is disposed distal from the inside face 22 of the accommodating door 20, outside the concavity.

The scissors mechanism 60 comprises two cooperating sets of scissors 64 and 65, articulated to and disposed between a first support flange 60a, which in turn is connected to the reinforcement flange 25, and a second support flange 60b, which in turn is connected to the support and dispensing cradle 40.

Each set of scissors 64, 65 comprises two support members 64a, 64b and 65a, 65b, respectively, linked in a criss-cross, X-like manner to each other, each of which is diagonally connected to the two support flanges in the following manner: one end thereof is connected to one support flange by a hinge 66, while an opposite end thereof is connected to the other support flange by a sliding track 67.

An electric piston 68 is hingedly connected at one end thereof 68a to a connecting bar 69 connecting between the two support members 64a and 65a, and on an opposite end thereof 68b to the second support flange 60b by a hinge. The piston 68 being configured to extend, as seen in FIG. 6E, and retract, as seen in FIG. 6D, so as to elongate and shorten the criss-cross 'X', oppositely to its own extension and retraction, and thereby displace the support and dispensing cradle 40 towards and away from the inside face 22 in a parallel fashion thereto.

As seen in FIG. 6C, when the accommodating door 20 is at the open position, and the support and dispensing cradle 40 is at its extended position, the support compartment 41 faces the gap G1 so as to be able to dispense the collapsed wheelchair 30 therethrough, utilizing the dispensing mechanism 50 therefor.

Figure 2B:
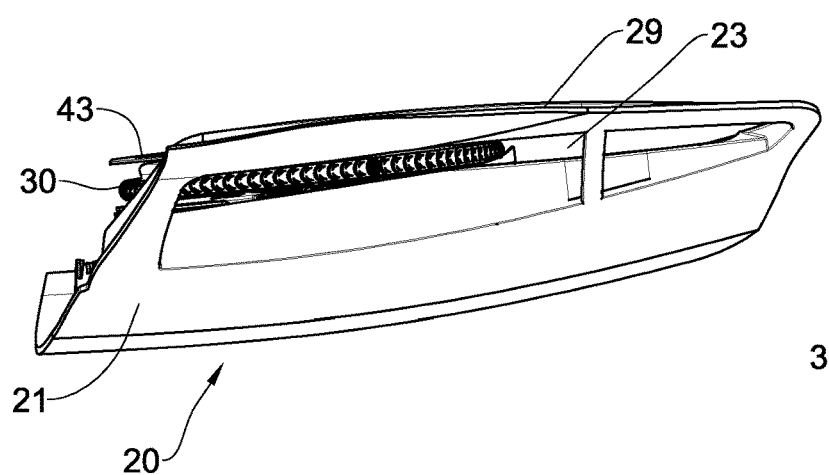
FIG. 2B is a top view of the accommodating door shown in FIG. 2A.
Figure 2C:
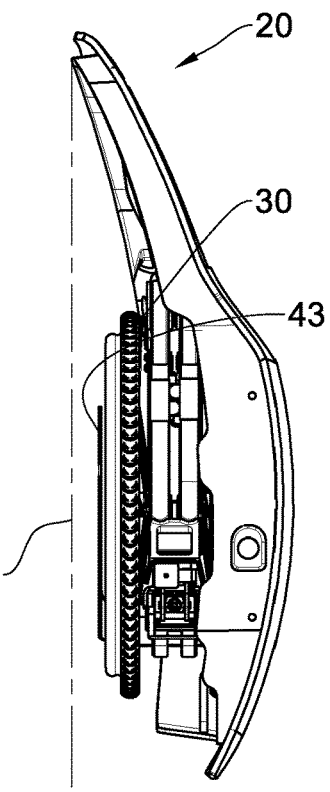
FIG. 2C is a front view of the accommodating door shown in FIG. 2A.

The support and dispensing cradle 40, is so shaped and sized to be accommodated within the accommodation space 23 in its entirety, at the storing position thereof, together with the collapsed wheelchair 30, such that when the accommodation door is being viewed from above, as in FIG. 2B, or from either side thereof (FIG. 2C) the support and dispensing cradle 40 does not project beyond an imaginary vertical line 39 extending downwards from an upper edge 29 of the accommodating door 20. Thus it is appreciated that at the storing position of the storage and dispensing cradle, the collapsed wheelchair does not project beyond the imaginary vertical line 39.

The arrangement herein is such that at the closed position of the accommodating door 20, as seen in FIG. 1, the support and dispensing cradle 40 does not interrupt the back seat 17 of the vehicle 10 and a back rest 17a thereof, any more than a non converted door such as the door 19 disposed oppositely to the accommodating door 20. Therefore the back seat 17, and particularly the back rest thereof 17a remains symmetrical with respect to a central longitudinal axis L of the vehicle 10.

Furthermore, the support compartment 41 of the support and dispensing cradle 40 is confined by an inner facing wall 43, defining a finger free space which restricts access to the support compartment 41 and the collapsed wheelchair 30, for a passenger sitting in the back seat 17.

Figure 7A:
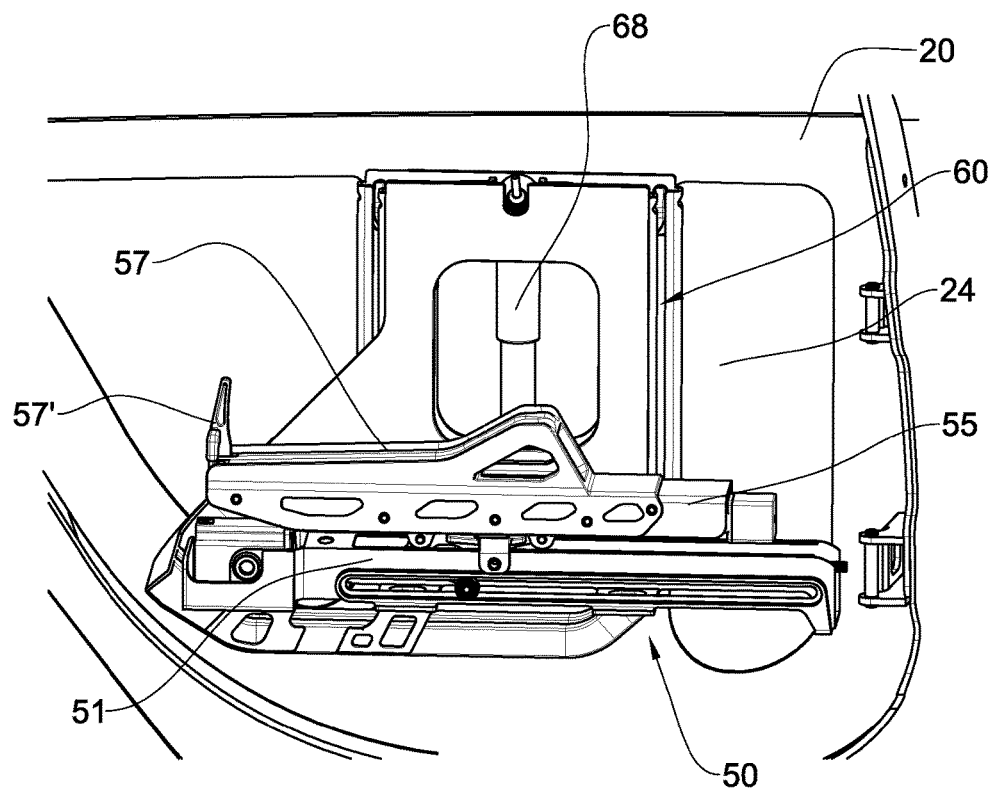
FIG. 7A is a close up cross-sectional view of portion B in FIG. 6A taken along line I-I, where a dispensing mechanism is shown.
Figure 7B:
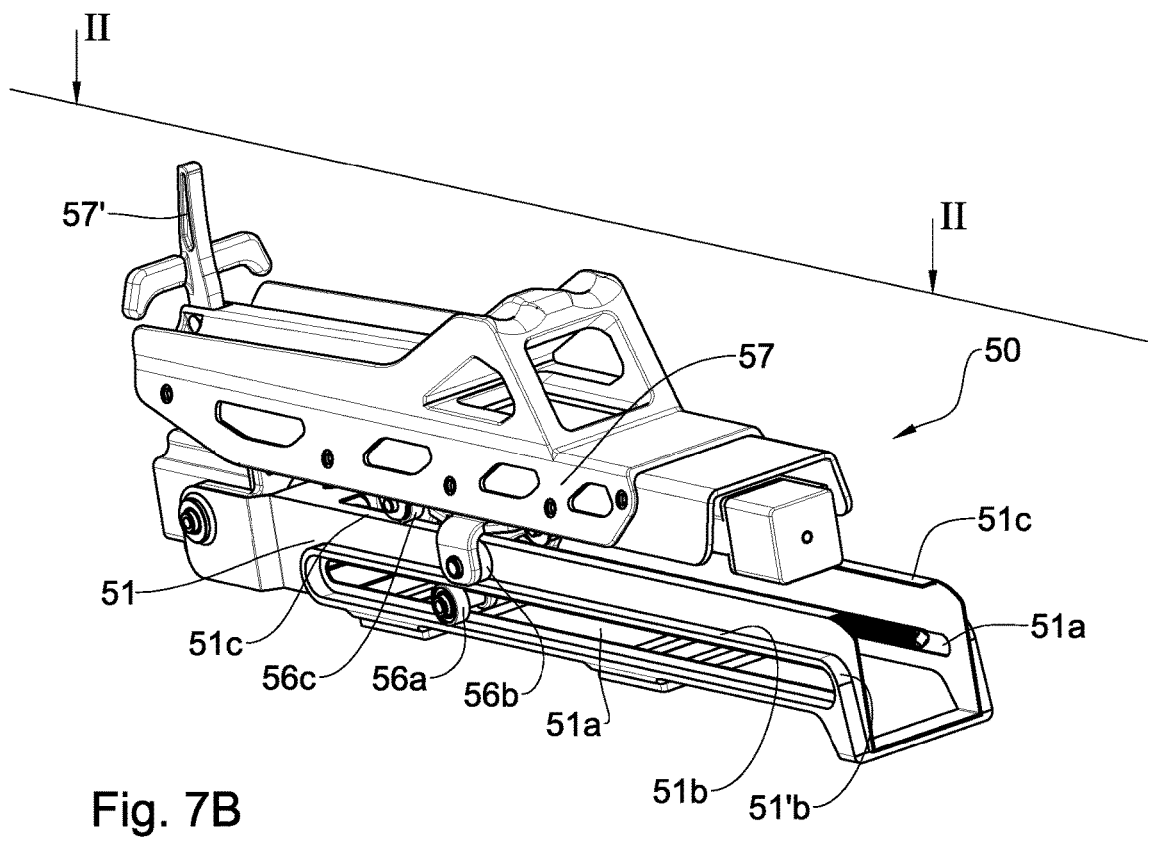
FIG. 7B is a side perspective view of the dispensing mechanism where a carrier cart is at a stowed position.
Figure 7C:
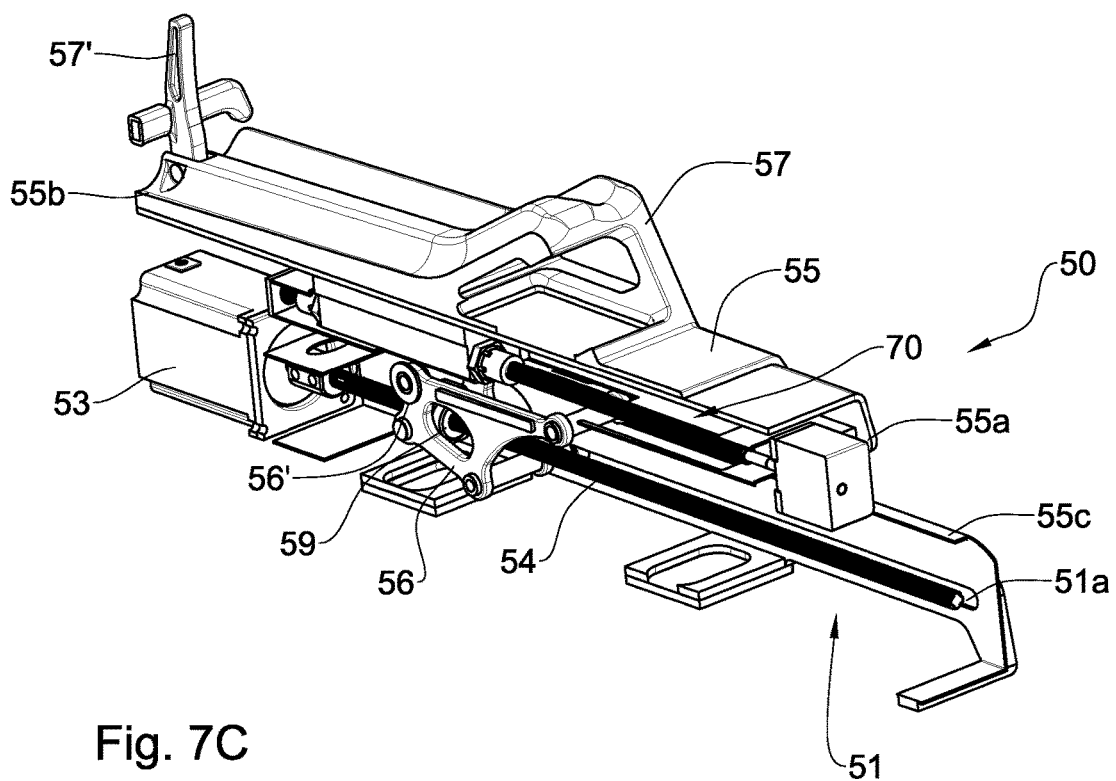
FIG. 7C is a cross-sectional view of the dispensing mechanism of FIG. 7B taken along line II-II.
Figure 7D:
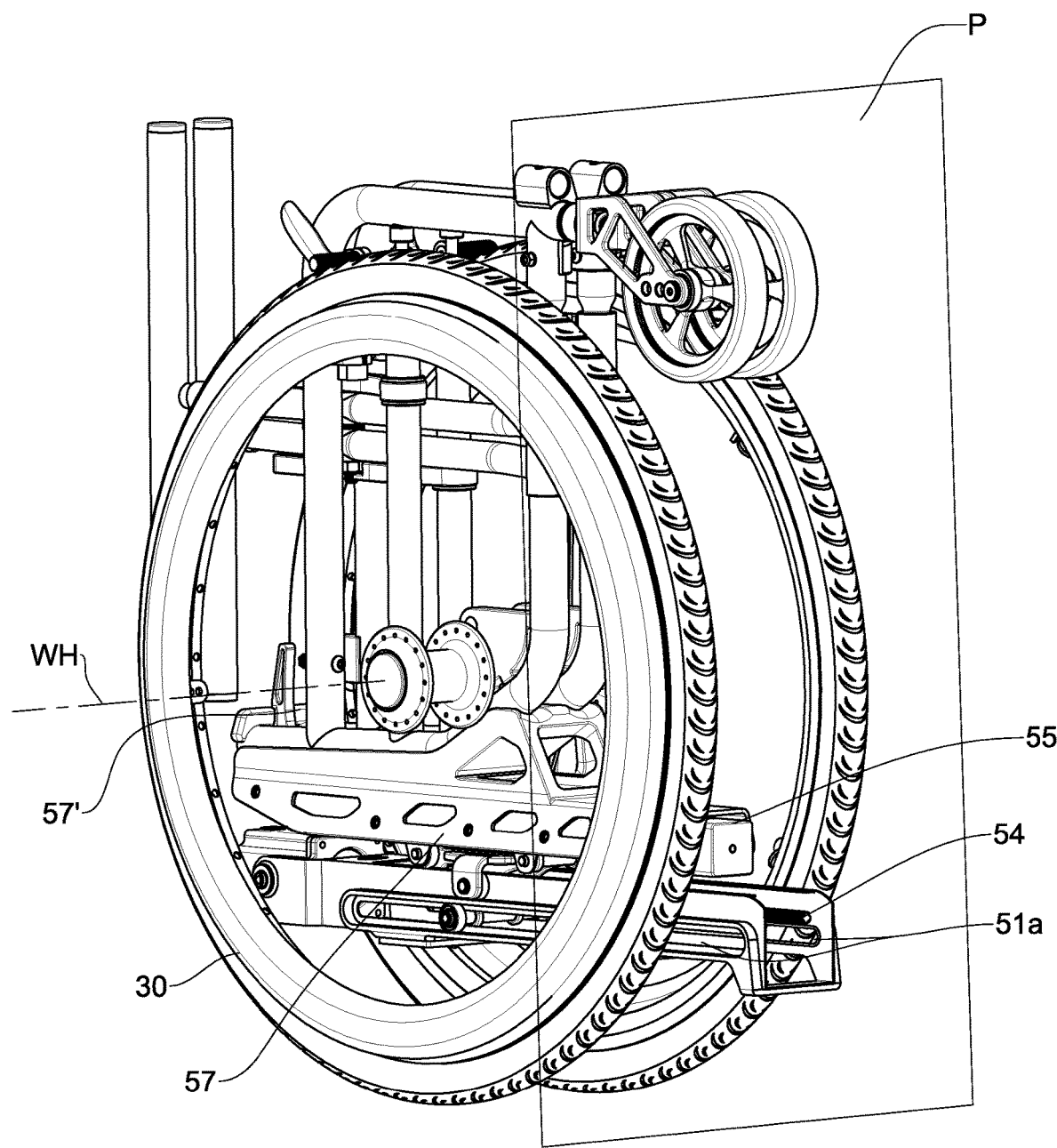
FIG. 7D is a perspective view of the dispensing mechanism of FIGS. 7A to 7C, with the mobility aid device mounted thereon.
Figure 7E:
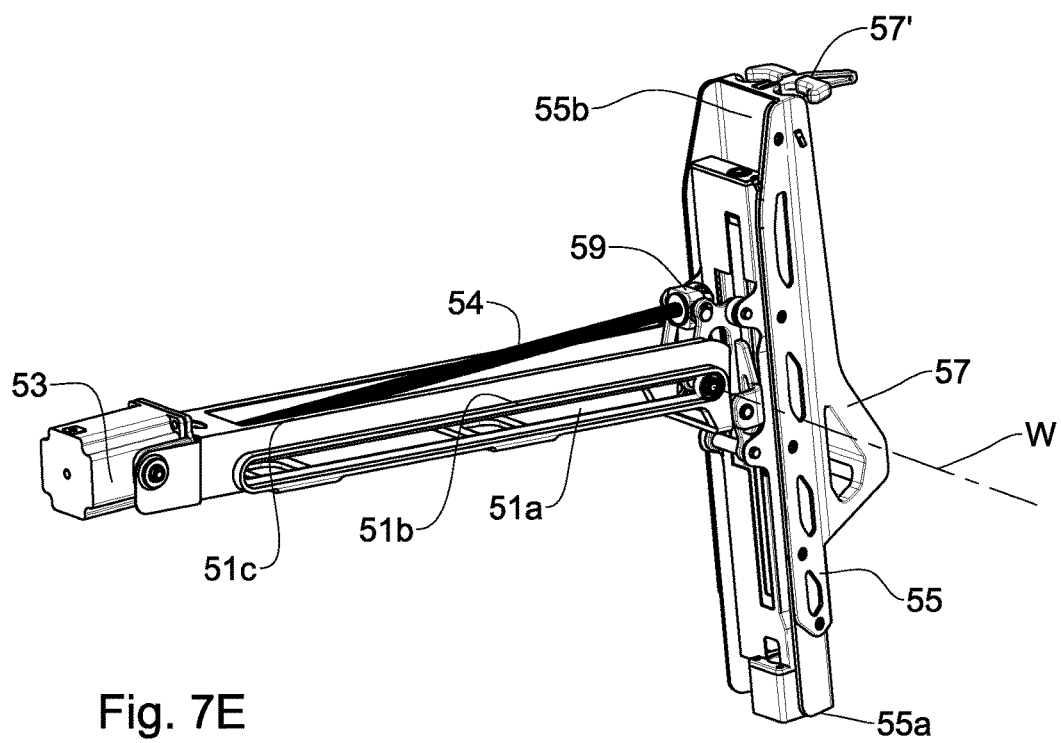
FIG. 7E is a side view of the dispensing mechanism where the carrier cart is at a dispensing position.
Figure 7F:
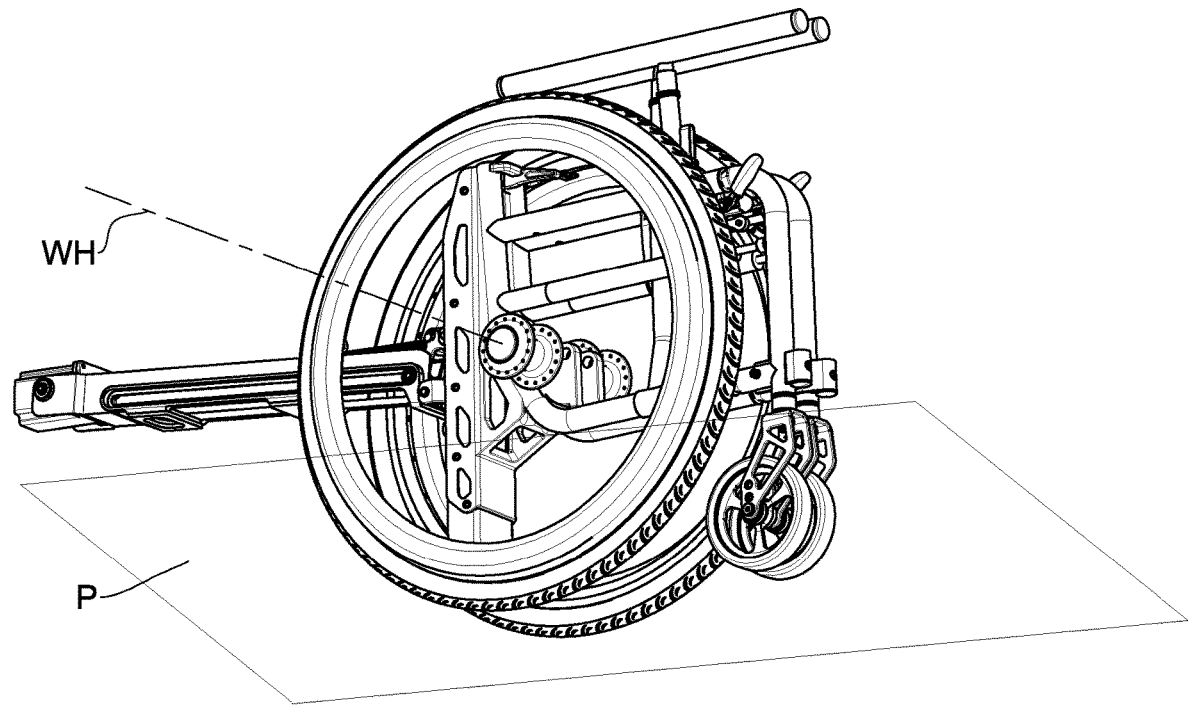
FIG. 7F is a perspective view of the dispensing mechanism of FIG. 7E, with the mobility aid device mounted thereon.

The dispensing mechanism 50, seen in greater detail in FIGS. 7A to 7F, comprises a track 51, and a mobility aid device carrier cart 55 configured to displace along the track 51 between a stowed position, seen in FIGS. 7A to 7D, and a dispensing position seen in FIGS. 7E and 7F. The carrier cart 55 comprises a shaped auxiliary member 57 which is configured to receive a frame element 31 of the collapsed wheelchair 30, and is formed with a bracing element 57' for selectively closing on the frame element 31 so as to hold the collapsed wheelchair 30 in position with respect to the shaped auxiliary member 57.

The track 51 comprises two guiding slits 51a, two corresponding upper running decks 51b disposed correspondingly thereabove, and two upper support platforms 51c disposed above the upper running decks 51b. The carrier cart 55 comprises a swinging element 56, best seen in FIGS. 7C and 7E, hingedly mounted with two corresponding sets of wheels disposed at opposite sides thereof. Each set of wheels comprising a slit running wheel 56a displaceable within the slit 51a, an upper decker wheel 56b disposed in front of the slit running wheel 56a and displaceable along the upper running deck 51b, and a support wheel 56c disposed rear to the slit running wheel 56a and displaceable along the support platform 51c.

The dispensing mechanism 50 further comprises a linear displacing arrangement for the carrier cart 55, best seen in FIGS. 7C and 7E, consists of a stepper motor 53, and a lead screw 54 connecting between the stepper motor 53 and a nut 59 mounted to a trailing portion 56b of the swinging element 56. The stepper motor 53 being configured to rotate the lead screw 54, which in turn urges the nut 59 to rotate therewith, and since the nut 59 is connected to the swinging element 56, which cannot rotate with respect to the track, the rotation motion of the lead screw 54 is being translated into linear motion of the nut with respect to the track, causing the nut 59 to displace together with the swinging element 56 and the entire carrier cart 55, back and forth along the track 51. When the upper decker wheel 56b reaches a downward curve 51b' of the upper running deck 51b, the swinging element 56 swings about a swing axis W (FIG. 7E) of the slit running wheels 56a, thereby changing the orientation of the carrier cart 55 from a stowed orientation, i.e., horizontal orientation, as seen in FIGS. 7A to 7D, where a leading end 55a of the carrier cart is leveled with respect to a trailing end 55b thereof, and where the collapsed wheelchair 30 is being supported by the shaped auxiliary member 57 from below, to a dispensing orientation, i.e., a substantially vertical orientation, as seen in FIGS. 7E and 7F, where the leading end 55a is lower than the trailing end 55b, and the collapsed wheelchair 30 leans against the shaped auxiliary member 57, and is being secured to the carrier cart by the bracing element 57'.

In the process of orientation changing, the trailing portion 56b of the swinging element 56, containing the nut 59 and the upper support wheels 56c, is being lifted with respect to the upper support platforms 51c, thereby changing the orientation of the lead screw 54. To allow such orientation change of the lead screw 54, connection between the stepper motor 53 and the track 55, as well as the connection between the nut 59 and the swinging element 56 is facilitated through a hinge imparting the lead screw a degree of freedom.

The swing can occur due to gravity, when a sufficient portion of the carrier cart 55 goes beyond the downward curve 51*b*', or by power of the stepper motor 53, when the slit running wheels 55*a* reaches an end 51*a*' of the guiding slit 51*a*, and the stepper motor 53 continues pushing the nut 59 together with the trailing portion 56*b* of the swinging element 56.

Throughout the change in orientation of the carrier cart 55, a wheel axis WH of the rear wheels of the collapsed wheelchair 30 maintains its orientation parallel to the ground.

In this embodiment the collapsed wheelchair 30 is configured to abut against the shaped auxiliary member 57 such that a driving plane P (FIGS. 7D, 7F, 9B, 9C, 9D and 9E) of the wheelchair defined tangentially to its wheels, is perpendicular to the upper running decks 51*b* at all time.

The carrier cart 55 further comprises a displacement mechanism 70, seen in greater detail in FIGS. 8A to 8D, similar to the dispensing mechanism 50 explained hereinabove, configured to displace the shaped auxiliary member 57 with respect to the swinging element 56.

Figure 8A:
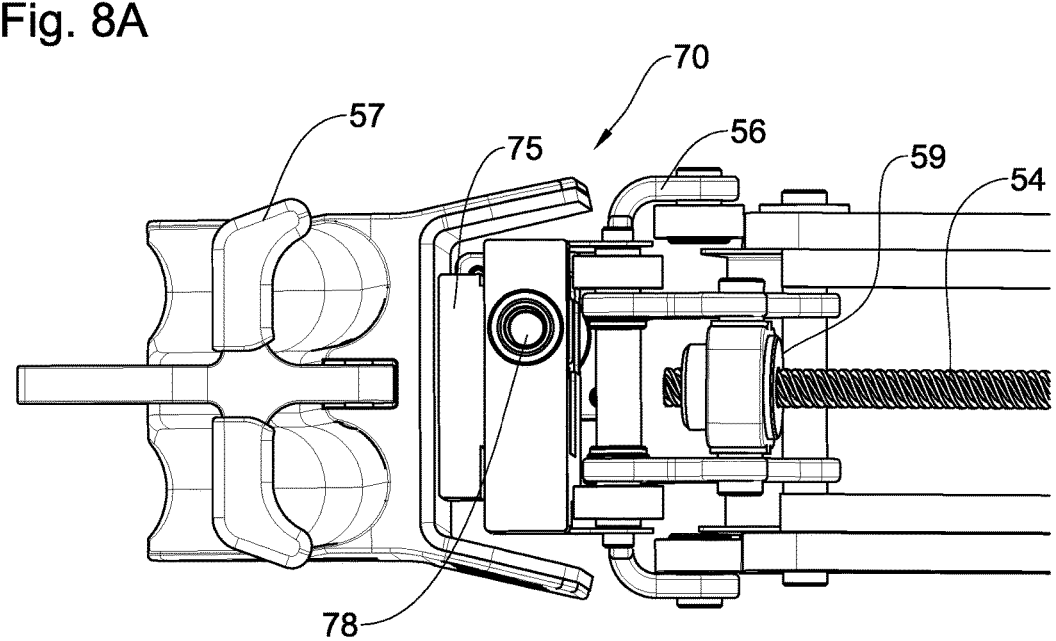
FIG. 8A is a top view of the carrier cart at the dispensing position, where a auxiliary carrier cart, is at a rear position.
Figure 8B:
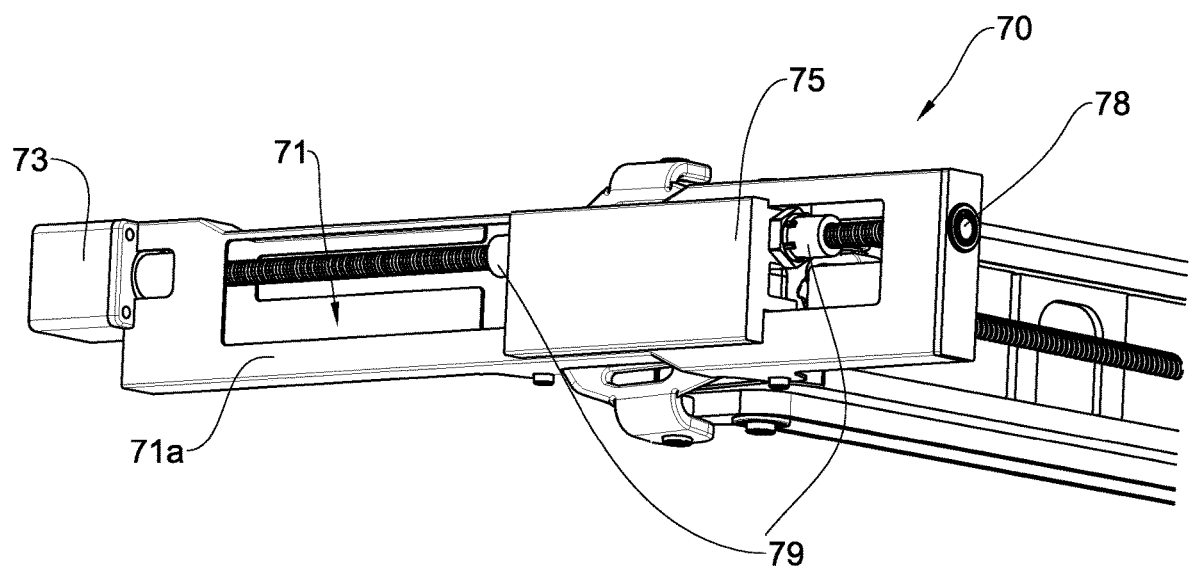
FIG. 8B is a top perspective view of the carrier cart of FIG. 8A where a shaped auxiliary member is omitted for clarity.
Figure 8C:
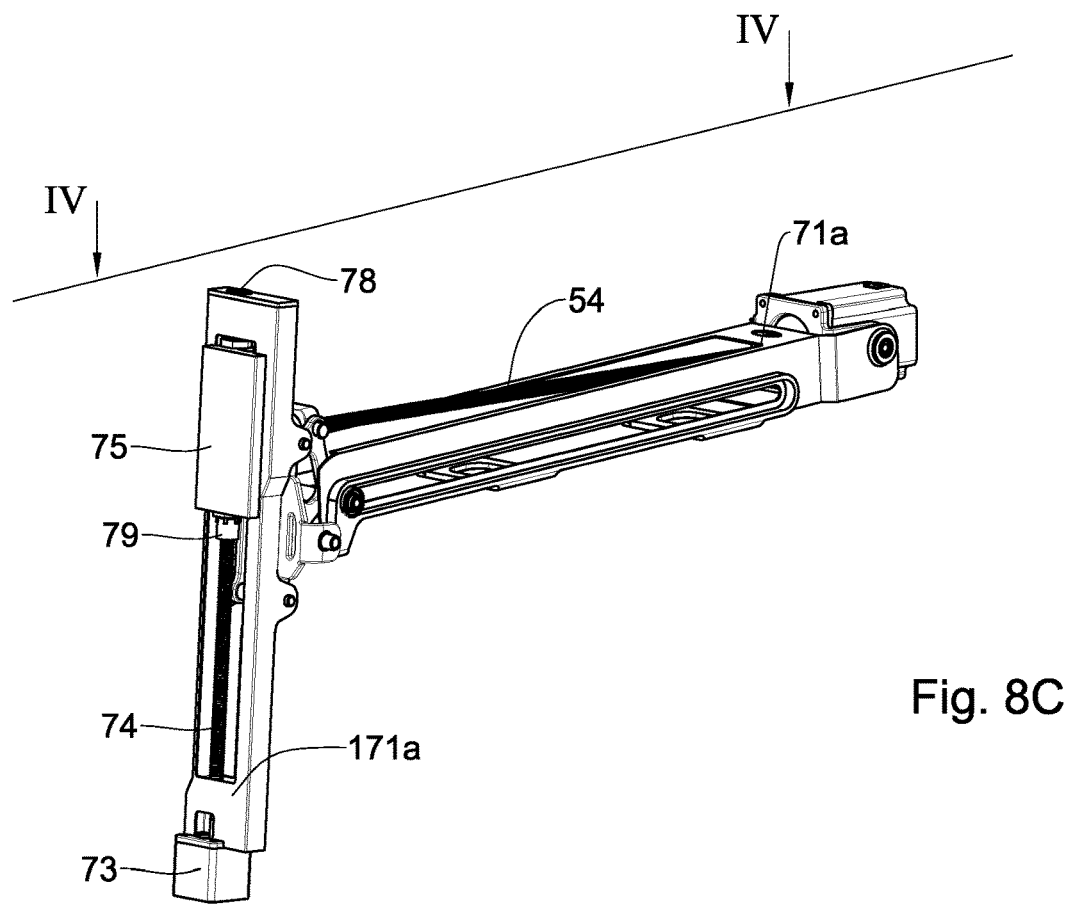
FIG. 8C is a side perspective view of the dispensing mechanism of FIG. 7E, where the shaped auxiliary member is omitted for clarity.
Figure 8D:
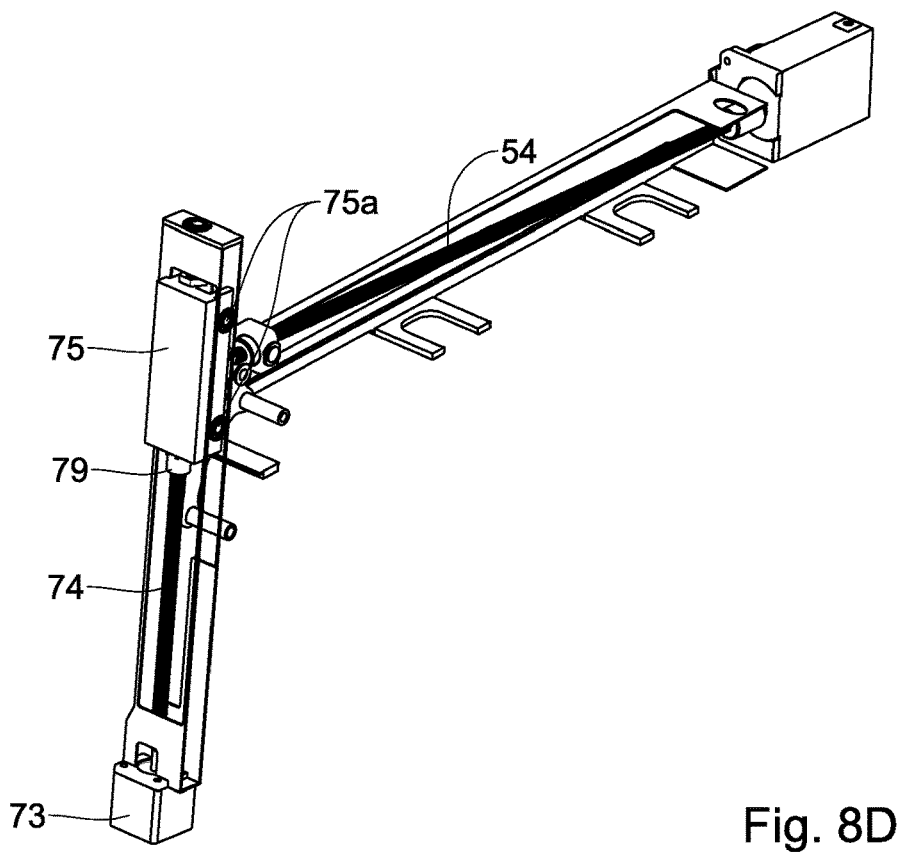
FIG. 8D is a cross sectional view of the dispensing mechanism of FIG. 8C taken along line Iv-Iv.
Figure 8E:
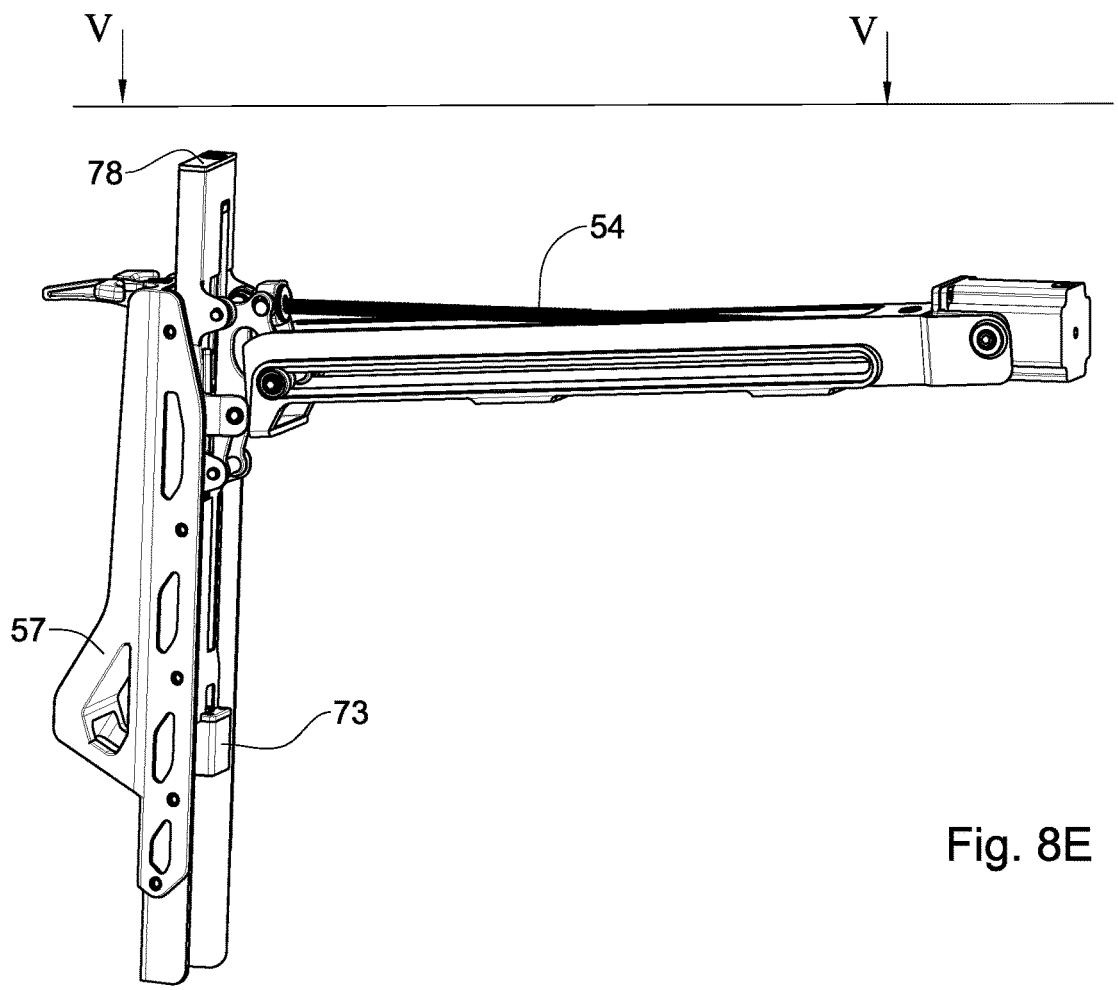
FIG. 8E is a rear perspective view of the carrier cart at the dispensing position, where an auxiliary carrier cart, is at a front position.
Figure 8F:
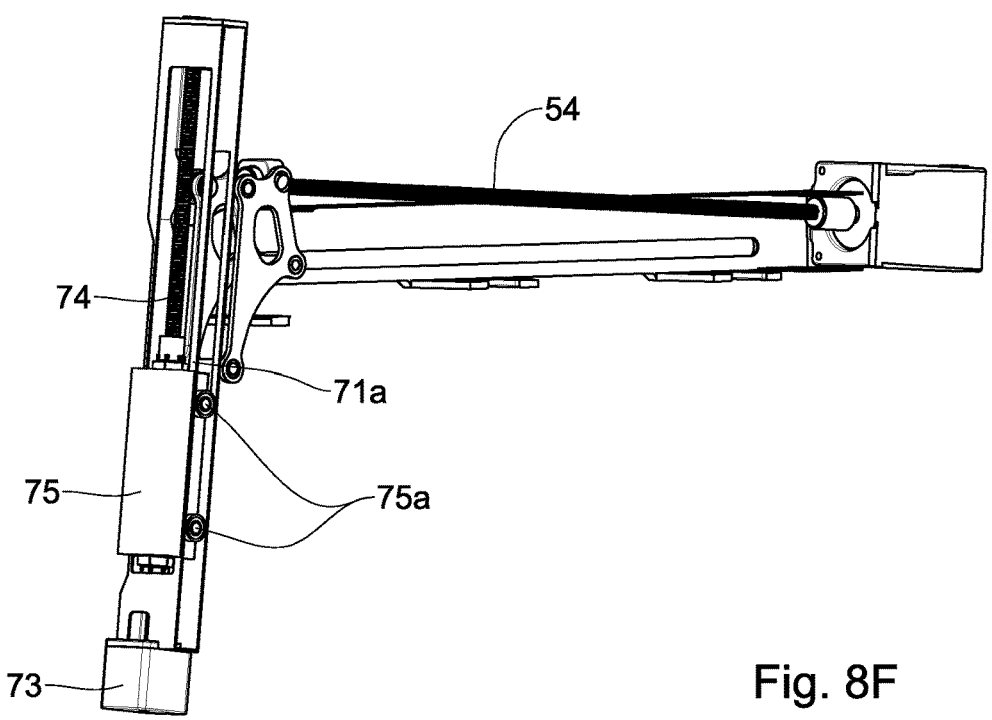
FIG. 8F is a cross sectional front perspective view of the carrier cart of FIG. 8E, taken along line V-V, where the shaped auxiliary member is omitted for clarity.

The auxiliary displacement mechanism 70, comprises a auxiliary track 71 partially enclosed within a cover 71*a*, and an auxiliary carrier cart 75 connected to the shaped auxiliary member 57, and configured to displace along the auxiliary track 71 between a rear position, seen in FIGS. 8A to 8D and a front position, seen in FIGS. 8E and 8F. The auxiliary carrier cart 75 comprises guiding wheels 75*a* configured to displace together with the carrier cart 75 along the auxiliary track 71 within the cover 71*a*, so as to maintain the auxiliary carrier cart 75 connected to the auxiliary track 71 at a constant orientation.

The carrier cart 55 further comprises a second linear displacement arrangement for the auxiliary carrier cart 75, which consists of a second stepper motor 73, and a second lead screw 74 extending between the second stepper motor 73 and a bearing 78. The lead screw 74 connecting between the second stepper motor 73 and a pair of nuts 79 connected at two opposite sides of the auxiliary carrier cart 75, along the lead screw 74.

The second stepper motor 73 being configured to rotate the second lead screw 74, which in turn urges the nuts 79 to rotate therewith, and since the nuts 79 are fixedly connected to auxiliary carrier cart 75, the wheels 75*a* thereof prevent the nuts 79 from rotating with the lead screw 74, thereby translating the rotating motion of the lead screw 74 into linear motion of the nuts 79 with respect to the track 71, causing the nuts 79 to displace together with the auxiliary carrier cart 75, back and forth along the track 71.

When the carrier cart 55 is at its dispensing orientation (FIGS. 7E and 7F), the displacement mechanism 70 is configured for lowering and raising the auxiliary carrier cart 75, together with the collapsed wheelchair 30, with respect to the support and dispensing cradle 40, between a storing height, shown in FIGS. 8A to 8D, and a dispensing height, shown in FIGS. 8E and 8F, which can also be defined to be the height of the pavement [not illustrated] where the deployment location 44 is defined.

The telescopic mechanism 15, the scissors mechanism 60, the dispensing mechanism 50 and the displacement mechanism 70 presented herein, can all be automated and be controlled by a control system [not illustrated], via a user interface [not illustrated] disposed in proximity to the driver's seat of the vehicle, to allow operation thereof by the mobility impaired driver. The communication between the control system and the operating elements mentioned above can be wired or wireless.

The power for displacing these mechanisms can be generated by a vehicle battery [not illustrated] which can be operatively connected to all. Alternatively, dedicated power source can be configured.

Attention is now directed to FIGS. 9A to 9E illustrating a deployment sequence of the collapsed wheelchair 30 from the vehicle 10.

Figure 9A:
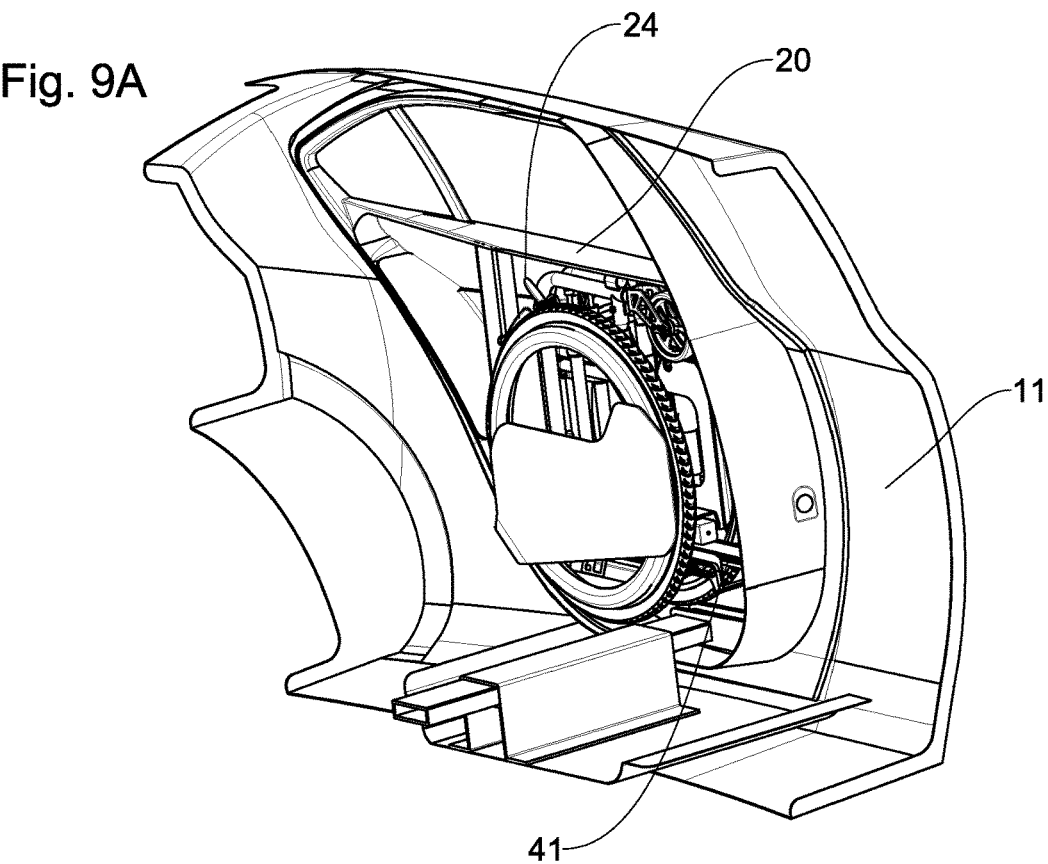
FIGS. 9A to 9E are consecutive steps of a deployment procedure of the mobility aid device according to an example of the present disclosure.
Figure 9B:
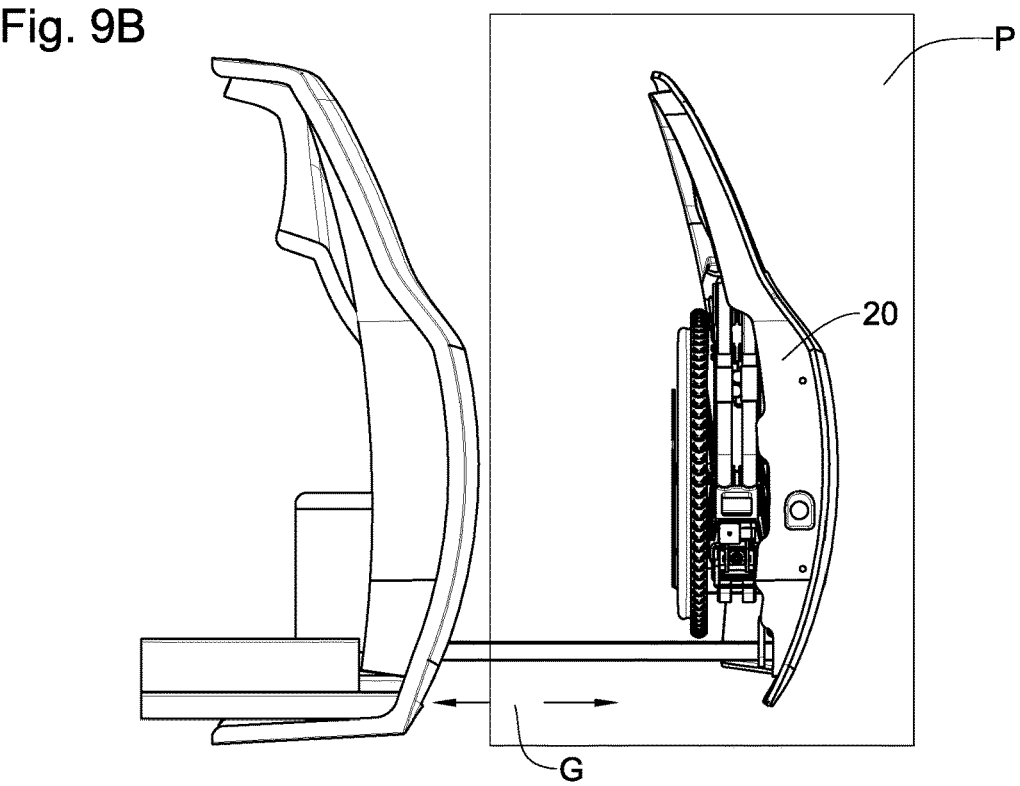
Figure 9C:
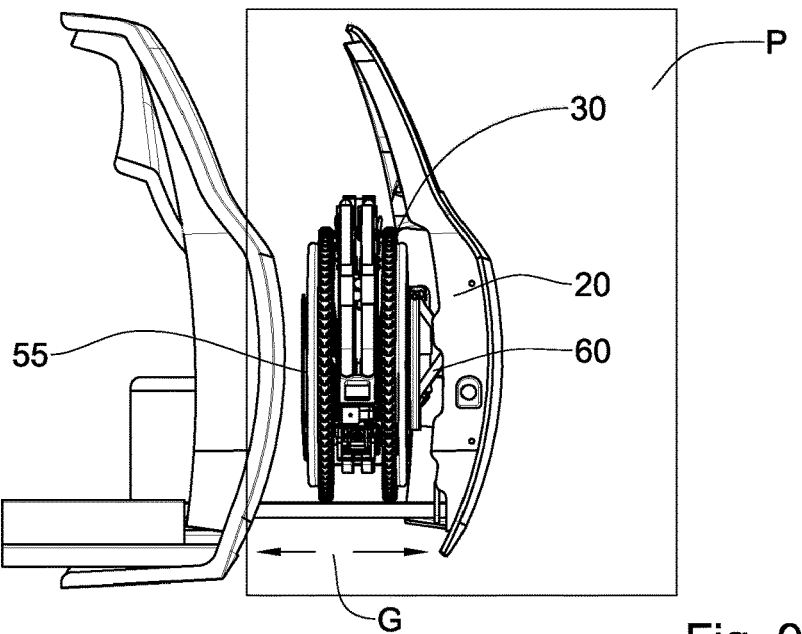
Figure 9D:
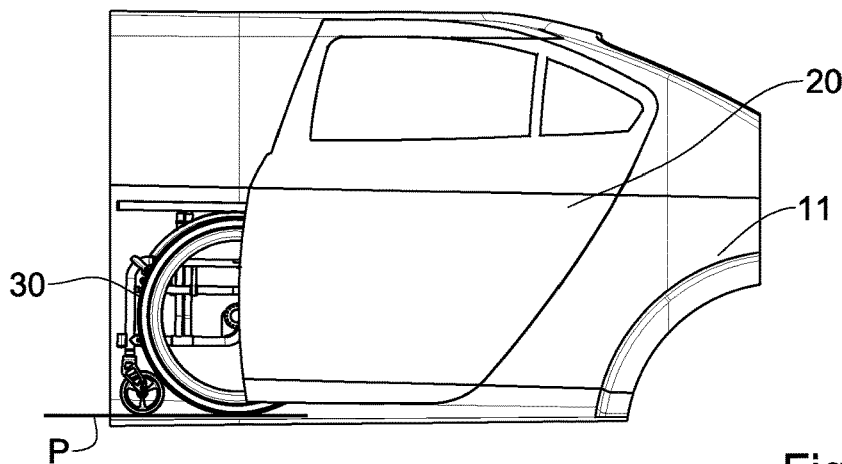
Figure 9E:
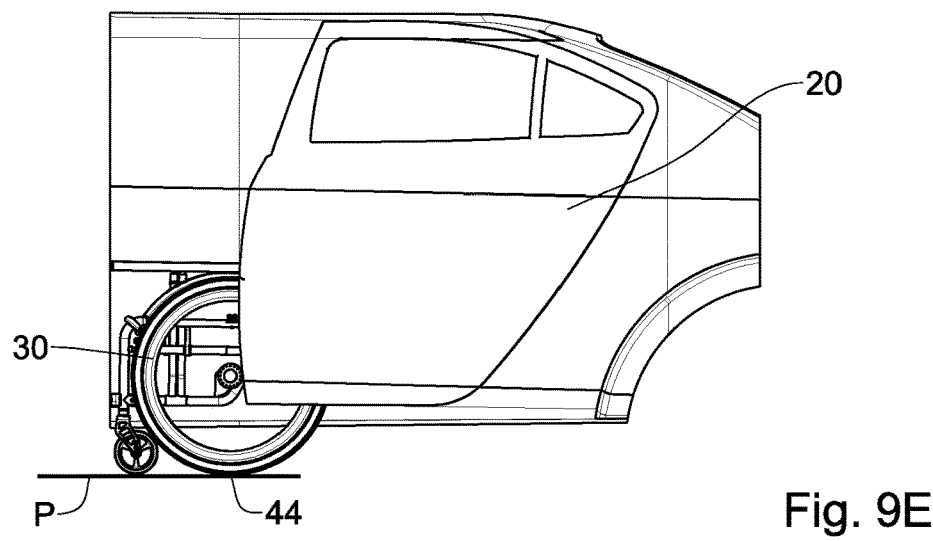

At a first step, the control system actuates the telescopic mechanism 15 to displace the accommodating door 20 from the closed position seen in FIG. 9A, to the open position seen in FIG. 9B, thereby extending at gap G.

At a second step, the control system actuates the scissors mechanism 60 to displace the support and dispensing cradle 40 away from the inside face 22 of the accommodating door 20, until the entire support compartment 41 is disposed outside the concavity and faces the gap G.

At a third step, the control system operates the dispensing mechanism 50 to displace the carrier cart 55, together with the collapsed wheelchair 30, from the stowed position, within the support compartment 41, to the dispensing position outside the support compartment 41.

At a fourth step, the control system operates the displacement mechanism 70, to bring the auxiliary carrier cart 75, together with the collapsed wheelchair 30, to the dispensing height, and thereby bring the collapsed wheelchair 30 to the deployment location 44.

The third and fourth steps of deployment can be conducted simultaneously or consecutively.

In the present example the vehicle 10 is a modified vehicle, originally having four passenger doors, wherein a rear left door was replaced by an accommodating door 20, as disclosed hereinabove. The modification comprised the steps of:

a) connecting the telescopic mechanism 15 to the vehicle floor;
b) connecting the load bearing member 12 to the telescopic mechanism 15;
c) connecting the accommodating door 20 to the load bearing member 12; and
d) connecting the support and dispensing cradle 40 to the reinforcement flange 25 of the accommodating door.

Figure 10A:
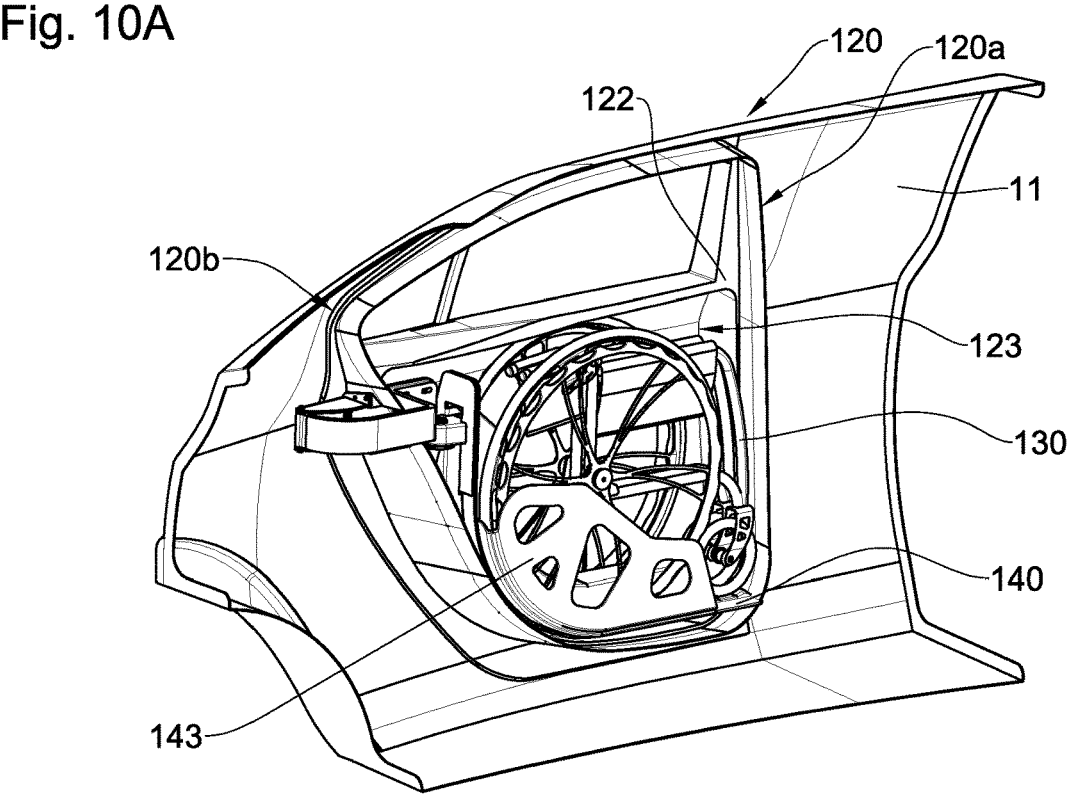
FIG. 10A is a perspective view of an accommodating door according to another example of the present disclosure, at a closed position thereof, connected to the vehicle body.
Figure 10B:
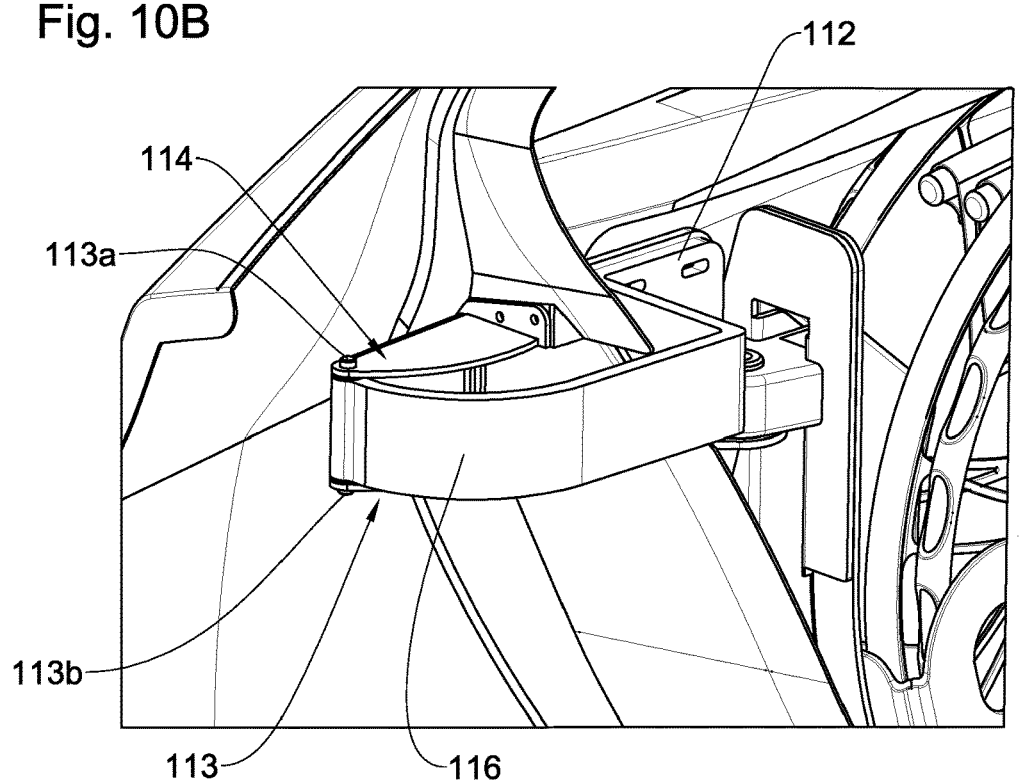
FIG. 10B is a close up view of portion C in FIG. 10A.

Attention is now directed to FIG. 10A illustrating another example of an accommodating door 120, connected to the vehicle body 11 as a rear passenger door in place of the accommodating door 20, and configured, similarly to the accommodating door 20, to accommodate therein a collapsed wheelchair 130.

The accommodating door 120, is a modified OEM door, converted into a suicide door of the vehicle 10, hinged at its rear end 120*b* rather than its front end 120*a*.

The accommodating door 120 having an inside face 122 configured to face the interior of the vehicle 10, which define an accommodation space 123 within a cavity of the accommodating door 120, configured to accommodate a support cradle 140, best seen in FIGS. 11A and 11B, configured to support the collapsed wheelchair 130 within a support compartment 141 thereof. The support compartment 141 is confined by an inner facing wall 143, defining a finger free space which restricts access to the support compartment 141 and the collapsed wheelchair 130, for a passenger sitting in the back seat 17 of the vehicle 10.

The support cradle 140 is further configured to advance the collapsed wheelchair 130 to a deployment location 144 (FIGS. 12E and 12F) near a driver door of the vehicle 10, where a mobility impaired driver of the vehicle 10 can reach the wheelchair 130. As can be understood from the figures, this deployment location 144 differs from the deployment location 44 of the support and dispensing cradle 40 by its height.

The accommodating door 20 further comprises a reinforcement flange 112, configured to support and reinforce the accommodating door 120 under pressure and loads applied thereon.

The accommodating door 120 is connected to the vehicle body 11 via a load bearing hinge 113. The load bearing hinge 113 comprises a shelf portion 114 which is articulated to a frame portion of the vehicle body 11 and includes a knuckle 113a, and a pivoting portion 116 which is articulated to the reinforcement flange 112 of the accommodating door and includes a pin 113b. The pin is configured to be disposed within the knuckle 113a so as to facilitate pivoting of the accommodating door 120 with respect to the vehicle body 11, between a closed position, seen in FIG. 9A and an open position, seen in FIGS. 12B and 12C. It can be appreciated that at the open position of the accommodating door 120, a gap J extends between the front end 120a of the accommodating door and the vehicle body 11, suitable for displacing the collapsed wheelchair 130 therethrough.

The reinforcement flange 112 includes a seat portion 111 which comprises a pin 112a on which a knuckle 140a of the support cradle 140 is configured to be positioned, so as to facilitate pivoting of the support cradle 140 with respect to the accommodating door 120, independently of the pivoting of the accommodating door 120 with respect to the vehicle body 11. This pivoting is performed between a storing position of the support cradle 140, seen in FIG. 9A, where the support cradle 140 is disposed adjacent to the inside face 122 of the accommodating door 120, within a concavity thereof, and an extended position, seen in FIGS. 11A,11B where the support cradle 140 is disposed distal from the inside face 122 of the accommodating door 120, outside the concavity When the accommodating door 120 is pivoted into its open position, the support cradle 140 can pivot together with the accommodating door, or the accommodating door and the support cradle can pivot separately.

The support cradle 140, is so shaped and sized to be accommodated within the accommodation space 123 in its entirety, at the storing position thereof, together with the collapsed wheelchair 130, such that when the accommodation door is being viewed from the side (FIG. 10C) the support cradle 140 does not project beyond an imaginary vertical line 139 extending downwards from an upper edge 129 of the accommodating door 120. Thus it is appreciated that at the storing position of the storage cradle 140, also the collapsed wheelchair does not project beyond the imaginary vertical line 139.

The arrangement herein is such that at the closed position of the accommodating door 120, the support and dispensing cradle 140 does not interrupt the back seat 17 of the vehicle 10 and a back rest 17a thereof, any more than a non-converted door such as the door 19. Therefore the back seat 17, and particularly the back rest thereof 17a remains symmetrical with respect to a central longitudinal axis L of the vehicle 10.

The support cradle 140 includes a base portion 147 and a chair engaging portion 149 which includes the inner facing wall 143 and the support compartment 141. The chair engaging portion 149 is configured to slide on the base portion 147 between a stowed position, seen in FIG. 11A and a dispensing position, as seen in FIG. 11B, so as to advance the chair 130 to the deployment location 144.

The sliding of the chair engaging portion 149 with respect to the base portion 147, the pivoting of the storage cradle 140 with respect to the accommodating door 120, and the pivoting of the accommodating door 120 with respect to the vehicle body 11, are all performed manually by the mobility impaired driver of the vehicle 10, reaching with his hand backwards, or by an assistant thereof such as a passenger sitting in the back seat. However, it can be appreciated that in other embodiments of the presently disclosed subject matter, these actions or some of them can be also performed automatically.

Attention is now directed to FIGS. 12A to 12F illustrating a deployment sequence of the collapsed wheelchair 130 from the vehicle 10.

Figure 12A:
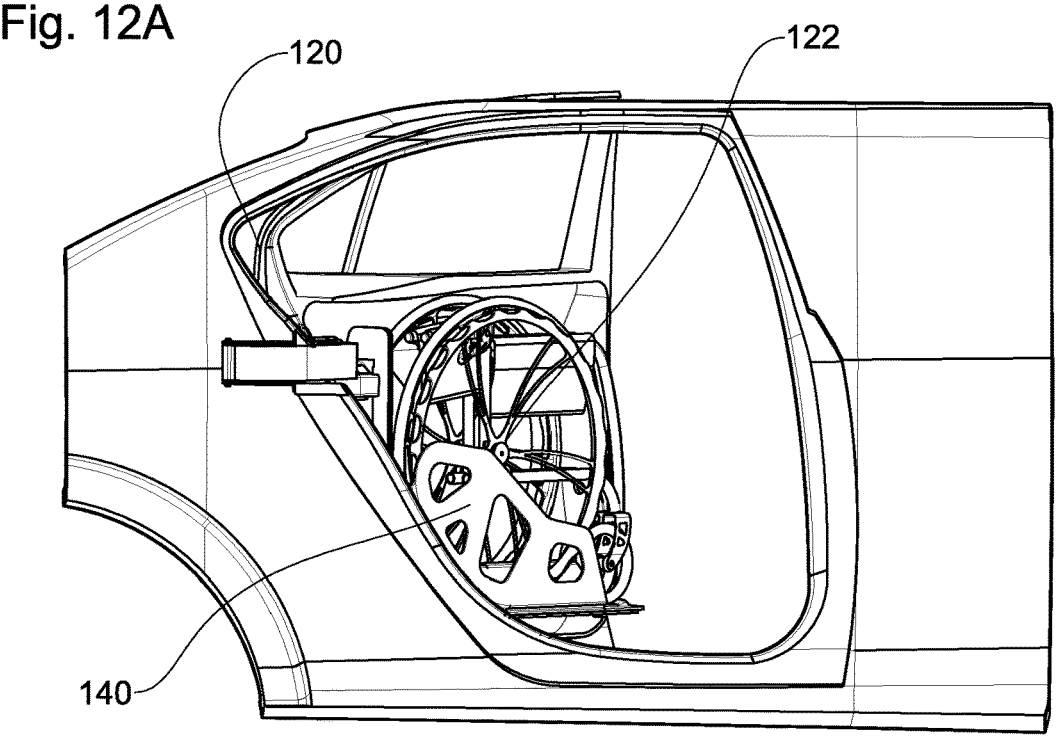
FIGS. 12A to 12F are steps of a deployment procedure of the mobility aid device according to another example of the present disclosure.
Figure 12B:
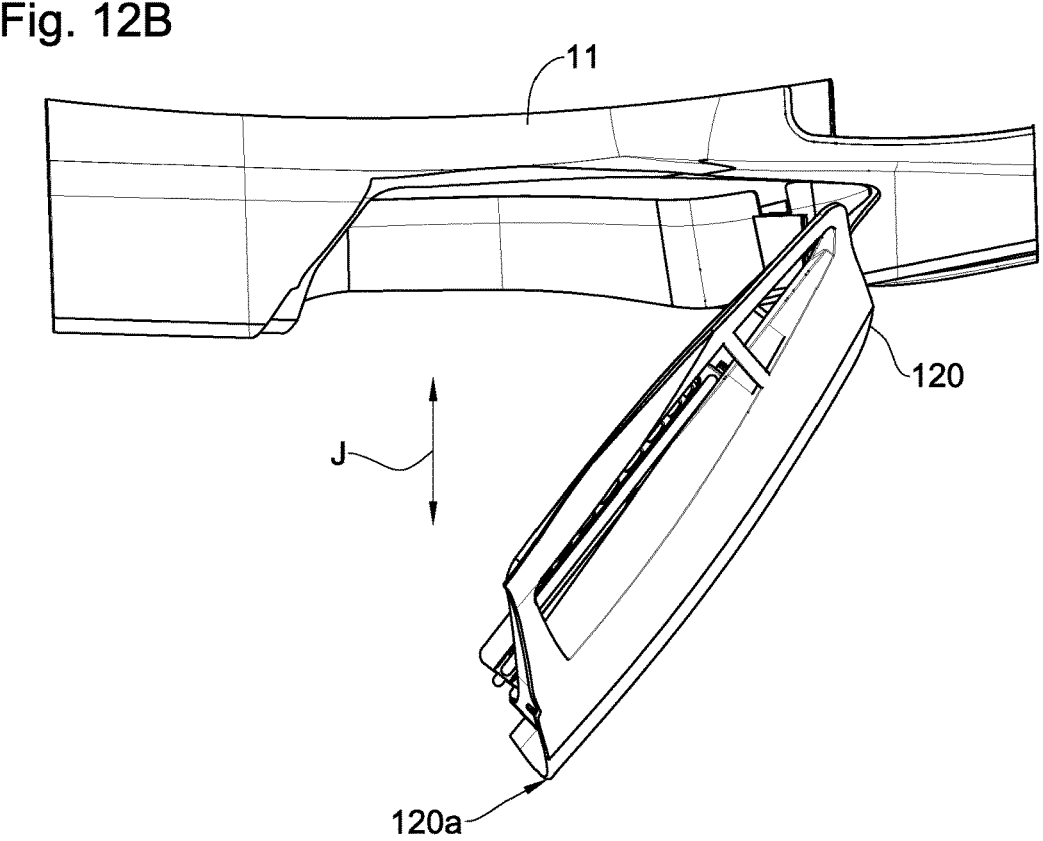

At a first step, the accommodating door 120 pivots from the closed position seen in FIG. 10A, to the open position seen in FIGS. 112A and 12B.

Figure 12C:
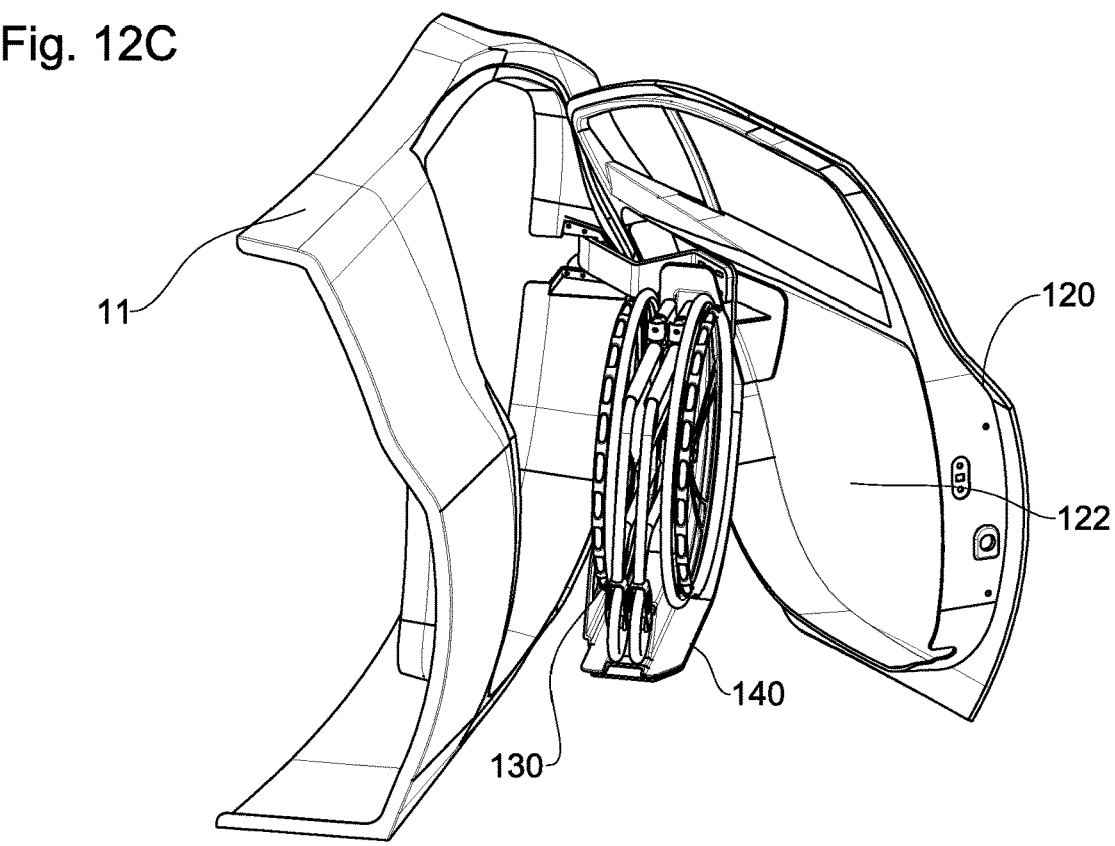
Figure 12D:
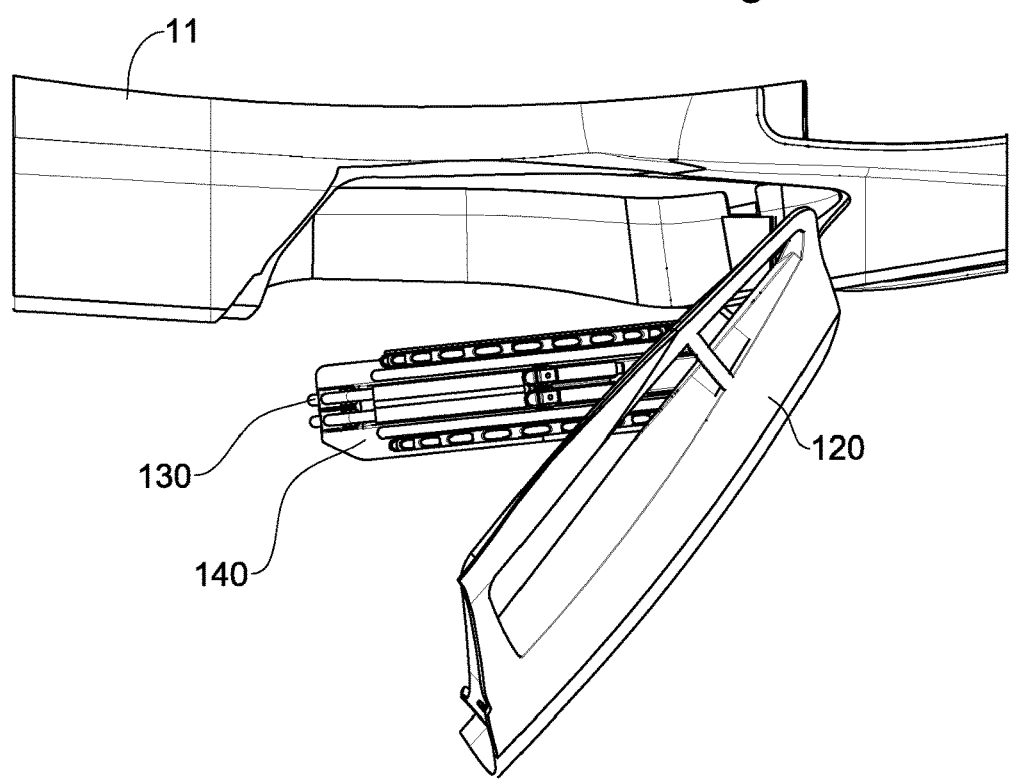

At a second step, the support cradle 140, together with the wheelchair 130, pivots with respect to the open accommodating door 120, from the storing position, seen in FIGS. 12A and 12B to the extended position, seen in FIGS. 12C and 12D, where the support and dispensing cradle is disposed distal from the inside face 122 of the accommodating door 120, outside the concavity.

Figure 12E:
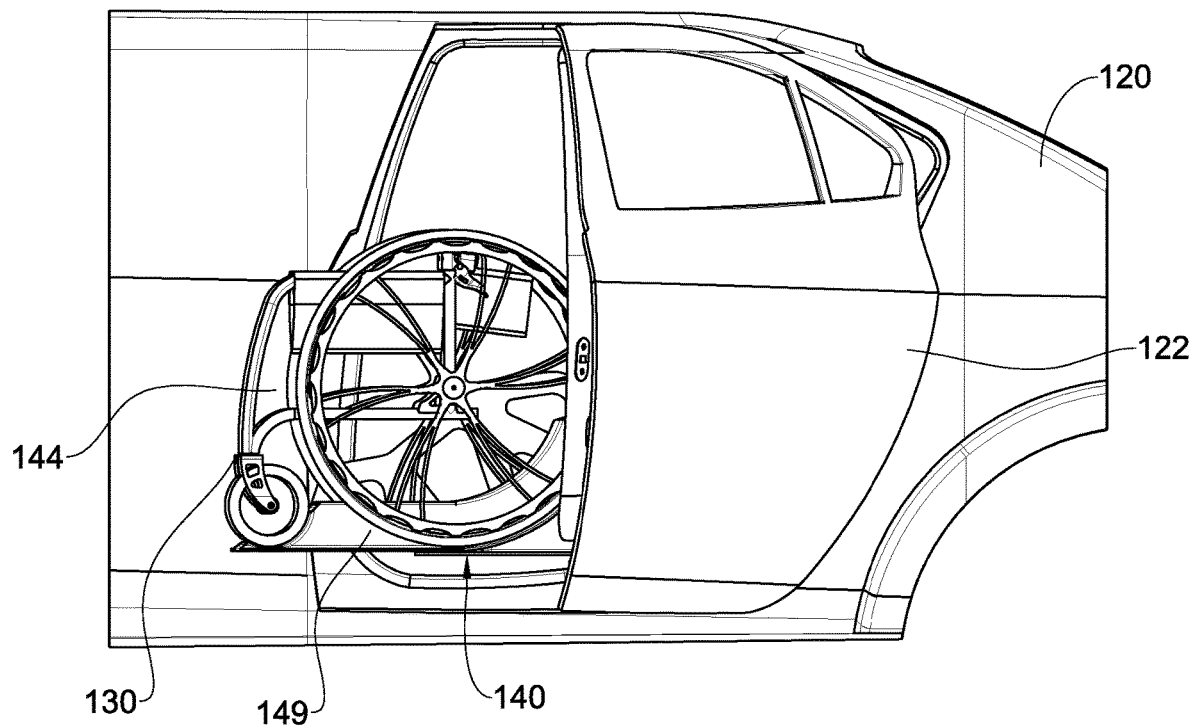
Figure 12F:
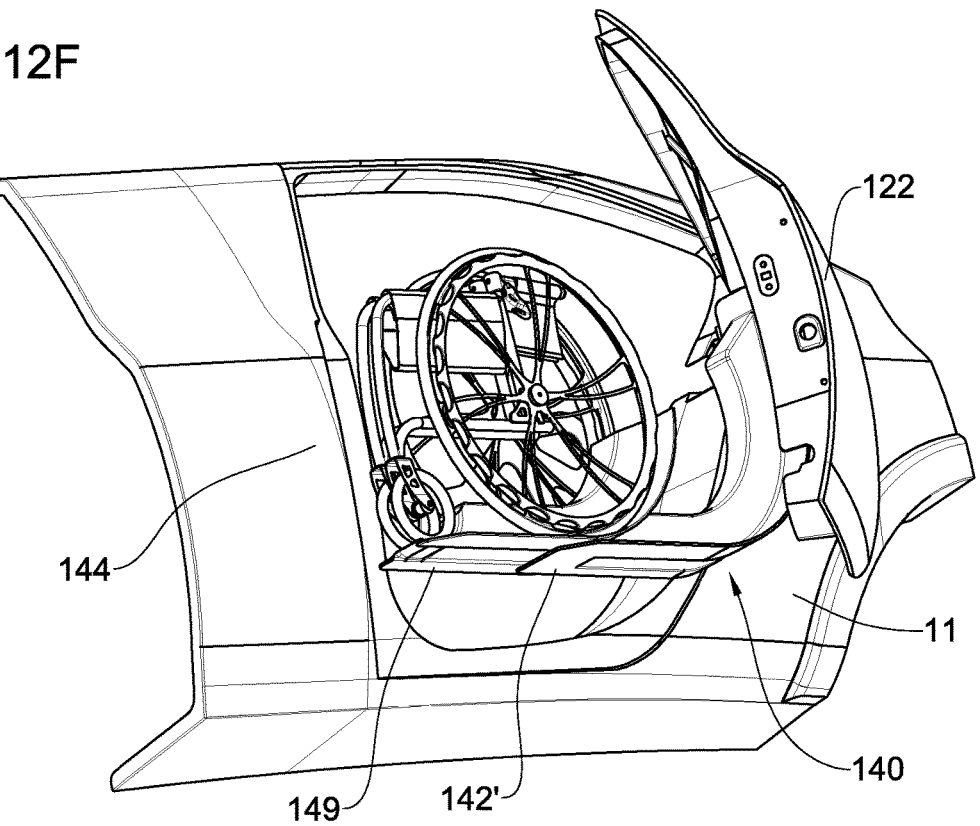

At a third step, the chair engaging portion 149 slides on the base portion 147 from its stowed position, seen in FIGS. 12C and 12D, to its dispensing position, seen in FIGS. 12E and 12F, thereby bringing the chair 130 to the deployment location 144.

From the deployment location, the mobility impaired driver reaches backwards through the driver door and pulls the chair 130 out of the support cradle 140.

The first and second steps of deployment can be conducted simultaneously or consecutively.

The invention claimed is:

1. An accommodating door, comprising:
    an inside face defining an accommodation space configured for accommodating a support cradle, which in turn is configured to support a mobility aid device within a support compartment thereof, said accommodating door is configured to be connected to a vehicle body and is connected to said support cradle;
    wherein the accommodating door further comprises an inner concavity in its inside face defining at least a portion of the accommodation space configured, together with an inner facing wall of the support cradle, to confine the accommodation space; and
    wherein the support cradle is connected to the accommodating door via an extension mechanism configured for displacing the support cradle between a storing position where the support cradle is at least partially accommodated in the concavity, and an extended position where at least the support compartment of the support cradle is disposed outside the concavity.

2. The accommodating door according to claim 1, wherein the accommodation space is configured to accommodate at least a majority of the support cradle.

3. The accommodating door according to claim 1, wherein the support cradle is configured to be accommodated in the accommodation space in its entirety.

4. The accommodating door according to claim 1, wherein the accommodating door further comprises a window and the support cradle does not project above a bottom window line.

5. The accommodating door according to claim 1, wherein the support cradle is a support and dispensing cradle which further comprises a dispensing mechanism disposed within the support compartment, configured to support said mobility aid device within the support compartment and dispense it to a deployment location outside the support compartment.

6. The accommodating door according to claim 5, wherein the dispensing mechanism comprising a track, and a mobility aid device carrier cart at least slidingly displaceable along the track between a stowed position, and a dispensing position, and wherein at the stowed position the carrier cart has a stowed orientation, different than a dispensing orientation thereof at the dispensing position, with respect to the ground.

7. The accommodating door according to claim 6, wherein the carrier cart has a leading end and a trailing end, and at the stowed orientation the leading end is leveled or higher with respect to the trailing end, and at the dispensing orientation the leading end is lower than the trailing end;
wherein the carrier cart is connected by a hinge to the track so as to be able to tilt with respect to the track; and
wherein the dispensing mechanism further comprises a linear displacement arrangement connected to the carrier cart at the trailing end thereof, distal from the hinge along the carrier cart, configured to push and pull the carrier cart.

8. The accommodating door according to claim 6, wherein the carrier cart further comprises a displacement mechanism, configured for linearly displacing a mobility aid device carrying portion of the carrier carrying cart with respect to a track engaging portion thereof.

9. The accommodating door according to claim 6, wherein the mobility aid device is a wheelchair, and the arrangement of the carrier cart is such, that a driving plane of the wheelchair defined tangentially to its wheels, is perpendicular to the track throughout the movement of the carrier cart.

10. The accommodating door according to claim 6, wherein the track is formed with a downward curve, such that the carrier cart changes its orientation from the stowed orientation to the dispensing orientation after reaching the downward curve; and
wherein the mobility aid device is a wheelchair, and wherein a wheel axis of the rear wheels of the wheelchair maintains a parallel orientation with respect to the ground at both the stowed position and the dispensing position.

11. The accommodating door according to claim 6, wherein the carrier cart is hingedly connected to the track so as to be able to tilt with respect to the track.

12. A vehicle comprising: a vehicle body and at least one accommodating door according to claim 1 connected to the vehicle body, said inside face facing an interior of the vehicle.

13. A vehicle according to claim 12, wherein the accommodating door is displaceable between an open position and a closed position, wherein at the open position a dispensing gap extends between a front edge of the door and the vehicle body.

14. A vehicle according to claim 13, wherein the accommodating door is connected to the vehicle via a load bearing member articulated to a vehicle frame by a linear displacement mechanism displaceable between a retracted position where the accommodating door is at the closed position, and an operational position where the accommodating door is at the open position.

15. A vehicle according to claim 14, wherein the accommodating door is hingedly articulated to the load bearing member, allowing the accommodating door to displace to a second open position where an entry gap extends between a back edge of the door and the vehicle body, wider than the dispensing gap.

16. A vehicle according to claim 13, wherein at the closed position of the accommodating door, a contour of an edge portion of an outside face of the accommodating door coincides with an adjacent contour of an outside face of the vehicle body.

17. A vehicle according to claim 12, wherein the accommodating door is disposed in register with a seating compartment of the vehicle comprising at least one seat, the arrangement being such that a backrest of the at least one seat is symmetrically disposed with respect to a central longitudinal axis of the vehicle.

18. A vehicle according to claim 13, wherein the accommodation space is configured to displace together with the accommodating door.

19. A vehicle according to claim 13, wherein the support cradle is hingedly connected to the accommodating door and configured to pivot about this hinge independently of accommodating door.

20. An accommodating door, comprising:
an inside face defining an accommodation space configured for accommodating a support cradle, which in turn is configured to support a mobility aid device within a support compartment thereof, said accommodating door is configured to be connected to a vehicle body and to said support cradle; and
wherein the support cradle is a support and dispensing cradle which further comprises a dispensing mechanism disposed within the support compartment, configured to support said mobility aid device within the support compartment and dispense it to a deployment location outside the support compartment.

21. A vehicle comprising: a vehicle body and at least one accommodating door, said accommodating door comprises
an inside face defining an accommodation space configured for accommodating a support cradle, which in turn is configured to support a mobility aid device within a support compartment thereof, said accommodating door is connected to said vehicle body and is configured to be connected to said support cradle;
wherein said inside face facing an interior of the vehicle;
wherein the accommodating door is displaceable between an open position and a closed position, wherein at the open position a dispensing gap extends between a front edge of the door and the vehicle body; and
wherein the accommodating door is connected to the vehicle via a load bearing member articulated to a vehicle frame by a linear displacement mechanism displaceable between a retracted position where the accommodating door is at the closed position, and an operational position where the accommodating door is at the open position.

* * * * *